US012318780B2

(12) United States Patent
Aghvami et al.

(10) Patent No.: US 12,318,780 B2
(45) Date of Patent: Jun. 3, 2025

(54) FLUIDIC DEVICE, INJECTOR SYSTEM, AND METHODS OF MAKING AND USING THE SAME

(71) Applicant: BRANDEIS UNIVERSITY, Waltham, MA (US)

(72) Inventors: S. Ali Aghvami, Waltham, MA (US); Seth Fraden, Newton, MA (US)

(73) Assignee: Brandeis University, Waltham, MA (US)

( * ) Notice: Subject to any disclaimer, the term of this patent is extended or adjusted under 35 U.S.C. 154(b) by 962 days.

(21) Appl. No.: 17/289,636

(22) PCT Filed: Oct. 29, 2019

(86) PCT No.: PCT/US2019/058602
§ 371 (c)(1),
(2) Date: Apr. 28, 2021

(87) PCT Pub. No.: WO2020/092396
PCT Pub. Date: May 7, 2020

(65) Prior Publication Data

US 2021/0394186 A1 Dec. 23, 2021

Related U.S. Application Data

(60) Provisional application No. 62/753,761, filed on Oct. 31, 2018.

(51) Int. Cl.
*B01L 3/00* (2006.01)

(52) U.S. Cl.
CPC ... *B01L 3/502784* (2013.01); *B01L 3/502738* (2013.01); *B01L 2200/0621* (2013.01);
(Continued)

(58) Field of Classification Search
None
See application file for complete search history.

(56) References Cited

U.S. PATENT DOCUMENTS 6,637,463 B1 * 10/2003 Lei .......................... B01L 13/02
137/841
11,148,140 B2 * 10/2021 Fraden .................... F04B 11/00
(Continued)

FOREIGN PATENT DOCUMENTS

WO 2018132831 A2 7/2018

OTHER PUBLICATIONS

Boukellal, et al. "Simple, robust storage of drops and fluids in a microfluidic device." Lab on a Chip 9.2 (Oct. 28, 2008): 331-338.
(Continued)

*Primary Examiner* — Paul S Hyun
*Assistant Examiner* — Mickey Huang
(74) *Attorney, Agent, or Firm* — Quarles & Brady, LLP

(57) ABSTRACT

Systems and methods are provided for producing isolated microfluidic droplets. In one aspect, a microfluidic system comprises a droplet isolation device and an injection system. The droplet isolation device includes at least one isolation unit and at least one capillary valve. The isolation unit has at least one chamber configured to receive at least two different aqueous solutions without mixing prior to entering the at least one chamber based at least in part on pressure levels of the at least two different aqueous solutions. The injection system includes an aqueous inlet, a non-aqueous inlet, a bypass outlet, a working fluid outlet, and a loading chamber. The injection system is configured to allow for a predetermined amount of each of the at least two different aqueous solutions to be delivered to the droplet isolation device sequentially.

15 Claims, 14 Drawing Sheets

(52) U.S. Cl.
CPC . *B01L 2200/0673* (2013.01); *B01L 2300/087* (2013.01); *B01L 2400/0406* (2013.01); *B01L 2400/0487* (2013.01); *B01L 2400/0688* (2013.01)

(56) References Cited

U.S. PATENT DOCUMENTS

| | | | | |
|---|---|---|---|---|
| 2002/0081222 | A1 | 6/2002 | Karp | |
| 2010/0252118 | A1 | 10/2010 | Fraden | |
| 2012/0196280 | A1 | 8/2012 | Karlsen | |
| 2018/0304260 | A1* | 10/2018 | Thomas | B01L 3/502761 |
| 2020/0238278 | A1 | 7/2020 | Fraden | |
| 2023/0201835 | A1* | 6/2023 | Youngbull | C12Q 1/6848<br>436/53 |

OTHER PUBLICATIONS

International Searching Authority. International Search Report and Written Opinion for application PCT/US2019/058602. Mailed on Feb. 25, 2020. 16 pages.

* cited by examiner

FLUIDIC DEVICE, INJECTOR SYSTEM, AND METHODS OF MAKING AND USING THE SAME

CROSS-REFERENCES TO RELATED APPLICATIONS

This application represents the U.S. National Stage of International Application No. PCT/US2019/058602, filed Oct. 29, 2019, which is related to, claims priority to, and incorporates herein by reference for all purposes U.S. Provisional Patent Application No. 62/753,761, filed Oct. 31, 2018.

STATEMENT REGARDING FEDERALLY SPONSORED RESEARCH

This invention was made with government support under award numbers 1534890 and 1209518 awarded by the National Science Foundation—Division of Materials Research. The government has certain rights in the invention.

BACKGROUND

1. Field of the Disclosure

This disclosure relates to a method for simultaneous generation and storage of isolated droplets of aqueous solutions.

2. Description of the Related Art

Existing methods of determining optimal concentrations for achieving the crystallization of various proteins include mixing macro-portions of multiple aqueous solutions. The mixtures are traditionally made by mixing the multiple aqueous solutions in testing trays, generally called crystallization trays. The testing trays have several mixture chambers, which contain the mixtures at various concentrations. These mixtures are then analyzed for protein crystallization. Often, due the macro-sized volume of these testing trays, it is cost prohibitive to test out multiple solution concentrations, as many types of proteins are exceedingly expensive.

SUMMARY

One aspect of the disclosure provides a microfluidic system comprising a droplet isolation device and an injection system. The droplet isolation device includes at least one isolation unit and at least one capillary valve. The isolation unit has at least one chamber configured to receive at least two different aqueous solutions. The at least one capillary valve is configured to allow for the at least two different aqueous solutions to be introduced into the at least one chamber without mixing prior to entering the at least one chamber based at least in part on pressure levels of the at least two different aqueous solutions. The injection system includes an aqueous inlet, a non-aqueous inlet, a bypass outlet, a working fluid outlet, and a loading chamber. The bypass outlet includes a selectively-actuated bypass valve. The working fluid outlet is in fluid communication with both the droplet isolation device and a selectively-actuated downstream valve. The loading chamber is in fluid communication with each of the aqueous inlet, the non-aqueous inlet, the bypass outlet, and the working fluid outlet. The selectively-actuated bypass valve and the selectively-actuated downstream valve are configured to collectively allow for a predetermined amount of each of the at least two different aqueous solutions to be delivered to the droplet isolation device sequentially.

In some forms, the predetermined amount of each of the at least two different aqueous solutions can be dependent on the volume of the loading chamber. The selectively-actuated bypass valve can be a mechanical valve. The selectively-actuated downstream valve can be a mechanical valve. The aqueous inlet can include a first loading capillary valve adjacent to the loading chamber and having a first loading pressure threshold, the non-aqueous inlet can include a second loading capillary valve adjacent to the loading chamber and having a second loading pressure threshold, and the bypass outlet can include a third loading capillary valve adjacent to the loading chamber and having a third loading pressure threshold. The first loading pressure threshold can be greater than the second loading pressure threshold, and the second loading pressure threshold can be greater than the third loading pressure threshold.

When the selectively-actuated downstream valve is closed and the selectively-actuated bypass valve is opened, the loading chamber can be configured to receive one of the at least two aqueous liquids from the aqueous inlet without the one of the at least two aqueous liquids entering the droplet isolation device. When the loading chamber is filled with the one of the at least two aqueous liquids and when the selectively-actuated downstream valve is opened and the selectively-actuated bypass valve is closed, the injection system can be configured to inject the predetermined amount of the one of the at least two aqueous liquids from the loading chamber into the droplet isolation device. The loading chamber can have a volume of between 10 pL and 10 mL.

Another aspect of the disclosure provides a microfluidic injection system for injecting predetermined amounts of aqueous solution into a microfluidic device. The microfluidic injection system comprises an aqueous inlet, a non-aqueous inlet, a bypass outlet, a working fluid outlet, and a loading chamber. The bypass outlet includes a selectively-actuated bypass valve. The working fluid outlet is in fluid communication with the microfluidic device and a selectively-actuated downstream valve. T loading chamber is in fluid communication with each of the aqueous inlet, the non-aqueous inlet, the bypass outlet, and the working fluid outlet. The selectively-actuated bypass valve and the selectively-actuated downstream valve are configured to collectively allow for a predetermined amount of an aqueous solution to be delivered to the droplet isolation device.

In some forms, the predetermined amount of the aqueous solution can be dependent on the volume of the loading chamber. The selectively-actuated bypass valve can be a mechanical valve. The selectively-actuated downstream valve can be a mechanical valve.

In some instances, the aqueous inlet can include a first loading capillary valve adjacent to the loading chamber and having a first loading pressure threshold, the non-aqueous inlet can include a second loading capillary valve adjacent to the loading chamber and having a second loading pressure threshold, and the bypass outlet can include a third loading capillary valve adjacent to the loading chamber and having a third loading pressure threshold. The first loading pressure threshold can be greater than the second loading pressure threshold, and the second loading pressure threshold can be greater than the third loading pressure threshold.

When the selectively-actuated downstream valve is closed and the selectively-actuated bypass valve is opened, the loading chamber can be configured to receive the aqueous solution from the aqueous inlet without the aqueous solution entering the working fluid outlet. When the loading chamber is filled with the aqueous solution and when the selectively-actuated downstream valve is opened and the selectively-actuated bypass valve is closed, the microfluidic injection system can be configured to inject the predetermined amount of the aqueous solution from the loading chamber into the working fluid outlet. The loading chamber can have a volume of between 10 pL and 10 mL.

Another aspect of the disclosure provides a microfluidic device comprising a main channel and an isolation unit. The main channel comprises an inlet, an outlet, an upstream portion, and a downstream portion. The isolation unit comprises a first chamber, a second chamber, a third chamber, a first fluid path, a second fluid path, a third fluid path, a fourth fluid path, and a bypass fluid path. The first fluid path provides fluid communication between the upstream portion of the main channel and the first chamber and including a first capillary valve. The second fluid path provides fluid communication between the first chamber and the second chamber and including a second capillary valve. The third fluid path provides fluid communication between the second chamber and the third chamber and including a third capillary valve. The fourth fluid path provides fluid communication between the third chamber and the downstream portion of the main channel and including a fourth capillary valve. The bypass fluid path provides fluid communication between the third chamber and the downstream portion of the main channel and including a bypass capillary valve.

In some forms, the first capillary valve can have a diameter of between 97 μm and 103 μm, the second capillary valve can have a diameter of between 57 μm and 63 μm, the third capillary valve can have a diameter of between 27 μm and 33 μm, the fourth capillary valve can have a diameter of between 17 μm and 23 μm, and/or the bypass valve can have a diameter of between 17 μm and 23 μm.

The main channel can further comprise a main channel capillary valve positioned between the upstream portion and the downstream portion. The main channel capillary valve can have a diameter of between 87 μm and 93 μm.

Another aspect of the disclosure provides a microfluidic device comprising at least one isolation unit and at least one capillary valve. The at least one isolation unit has at least one chamber. The at least one chamber is configured to receive at least two different aqueous solutions. The at least one capillary valve is configured to allow for the at least two different aqueous solutions to be introduced into the at least one chamber without mixing prior to entering the at least one chamber based at least in part on pressure levels of the at least two different aqueous solutions.

In some forms, a relative volume of each of the at least two different aqueous solutions when introduced into the at least one chamber is determined by a location of a bypass capillary valve within the at least one chamber. The at least one chamber can be at least two chambers. The microfluidic device can further comprise a main channel, wherein the at least one chamber is in fluid communication with the main channel via the at least one capillary valve. The main channel can comprise an inlet, an outlet, an upstream portion, and a downstream portion. The upstream portion can be disposed between the inlet and the downstream portion, and the downstream portion can be disposed between the upstream portion and the outlet. The at least one capillary valve can include a first capillary valve, a second capillary valve, and a third capillary valve.

The microfluidic device can further comprise a first fluid path, a second fluid path, a third fluid path, and a bypass fluid path. The first fluid path can provide fluid communication between a first chamber of the at least two chambers and the upstream portion of the main channel. The first fluid path can include the first capillary valve. The first capillary valve can have a first pressure threshold. The second fluid path can provide fluid communication between the first chamber and a second chamber of the at least two chambers. The second fluid path can include the second capillary valve. The second capillary valve can have a second pressure threshold. The third fluid path can provide fluid communication between the second chamber and the downstream portion of the main channel. The third fluid path can include the third capillary valve. The third capillary valve can have a third pressure threshold. The bypass fluid path can provide fluid communication between one of the at least two chambers and the downstream portion of the main channel. The bypass fluid path can include the bypass capillary valve having a bypass pressure threshold. The bypass fluid path can provide fluid communication between the first chamber and the downstream portion. The bypass fluid path can connect to the first chamber upstream of the second fluid path. The bypass fluid path can provide fluid communication between the second chamber and the downstream portion.

The bypass fluid path can connect to the second chamber upstream of the third fluid path. The bypass fluid path can be positioned at a location wherein introducing a first aqueous solution of the at least two different aqueous solutions fills a first portion of the at least two chambers and subsequently introducing a non-aqueous fluid fills a second portion of the at least two chambers, thereby separating the first aqueous solution from the upstream portion of the main channel, and wherein introducing a second aqueous solution of the at least two different aqueous solutions fills the second portion of the at least two chambers and forces the non-aqueous fluid out of the at least two chambers through the bypass fluid path.

In some forms, the second pressure threshold can be greater than the first pressure threshold, and the third pressure threshold can be greater than the second pressure threshold, and the bypass pressure threshold can be greater than the second pressure threshold but less than the third pressure threshold.

The at least two chambers can further be at least three chambers including a first chamber, a second chamber, and a third chamber. In this case, the microfluidic device can comprise a first fluid path, a second fluid path, a third fluid path, a fourth fluid path, and a bypass fluid path. The first fluid path can provide fluid communication between the first chamber of the at least three chambers and the upstream portion of the main channel. The first fluid path can include the first capillary valve. The first capillary valve can have a first pressure threshold. The second fluid path can provide fluid communication between the first chamber and a second chamber of the at least three chambers. The second fluid path can include the second capillary valve. The second capillary valve can have a second pressure threshold. The third fluid path can provide fluid communication between the second chamber and the third chamber of the at least three chambers. The third fluid path can include the third capillary valve. The third capillary valve can have a third pressure threshold. The fourth fluid path can provide fluid communication between the third chamber and the downstream portion of the main channel. The fourth fluid path can include a fourth capillary valve. The fourth capillary valve can have a fourth pressure threshold. The bypass fluid path can provide fluid communication between one of the at least three chambers and the downstream portion of the main channel. The bypass fluid path can include the bypass capillary valve having a bypass pressure threshold.

In some forms, the second pressure threshold can be greater than the first pressure threshold, and the third pressure threshold can be greater than the second pressure threshold, and the fourth pressure threshold can be greater than the third pressure threshold, and the bypass pressure threshold can be greater than the third pressure threshold and less than the fourth pressure threshold.

The bypass fluid path can provide fluid communication between the first chamber and the downstream portion. The bypass fluid path can connect to the first chamber upstream of the second fluid path. The bypass fluid path can provide fluid communication between the second chamber and the downstream portion. The bypass fluid path can connect to the second chamber upstream of the third fluid path. The bypass fluid path can provide fluid communication between the third chamber and the downstream portion. The bypass fluid path can connect to the third chamber upstream of the fourth fluid path. The bypass fluid path can be positioned at a location wherein introducing a first aqueous solution of the at least two different aqueous solutions fills a first portion of the at least three chambers and subsequently introducing a non-aqueous fluid fills a second portion of the at least three chambers, thereby separating the first aqueous solution from the upstream portion of the main channel, and wherein introducing a second aqueous solution of the at least two different aqueous solutions fills the second portion of the at least three chambers and forces the non-aqueous fluid out of the at least three chambers through the bypass fluid path.

The first chamber can have a first volume and the second chamber can have a second volume that is larger than the first volume. The first chamber can have a first volume and the second chamber can have a second volume that is smaller than the first volume. The first chamber can have a first volume and the second chamber can have a second volume that is larger than the first volume. The first chamber can have a first volume and the second chamber can have a second volume that is smaller than the first volume. The third chamber can have a third volume that is larger than the second volume. The third chamber can have a third volume that is smaller than the second volume. The third chamber can have a third volume that is larger than the first volume. The third chamber can have a third volume that is smaller than the first volume. The at least one isolation unit can be at least four isolation units.

Another aspect of the disclosure provides a microfluidic device comprising at least one chamber configured to receive at least two different aqueous solutions and a non-aqueous fluid, wherein the at least two different aqueous solutions and the non-aqueous fluid are selectively introduced into the at least one chamber based on pressure levels of the at least two different aqueous solutions and the non-aqueous fluid so as to prevent mixing of the at least two different aqueous solutions prior to entering the at least one chamber.

Another aspect of the disclosure provides a microfluidic device comprising at least one chamber configured to receive at least two different aqueous solutions, wherein the at least two different aqueous solutions are selectively introduced into the at least one chamber based on a pressure level of the at least two different aqueous solutions.

Another aspect of the disclosure provides a microfluidic device comprising a main channel and an isolation unit. The main channel comprises an inlet, an outlet, an upstream portion, and a downstream portion. The isolation unit comprises a first chamber, a second chamber, a first fluid path, a second fluid path, a third fluid path, and a bypass fluid path. The first fluid path provides fluid communication between the upstream portion of the main channel and the first chamber and includes a first capillary valve. The second fluid path provides fluid communication between the first chamber and the second chamber and includes a second capillary valve. The third fluid path provides fluid communication between the second chamber and the downstream portion of the main channel and includes a third capillary valve. The bypass fluid path provides fluid communication between one of the first and second chambers and the downstream portion of the main channel and includes a bypass capillary valve.

Another aspect of the disclosure provides a microfluidic device comprising a main channel and an isolation unit. The main channel comprises an inlet, an outlet, an upstream portion, and a downstream portion. The isolation unit comprises at least one chamber, a first fluid path, a second fluid path, and a bypass fluid path. The first fluid path provides fluid communication between the upstream portion of the main channel and the at least one chamber and includes a first capillary valve. The second fluid path provides fluid communication between the at least one chamber and the downstream portion of the main channel and includes a second capillary valve. The bypass fluid path provides fluid communication between the at least one chamber and the downstream portion of the main channel and includes a bypass capillary valve, the bypass fluid path being positioned at a location wherein introducing a first aqueous solution fills the at least one chamber a first portion of the at least one chamber and the bypass fluid path allows a non-aqueous fluid to fill a second portion of the at least one chamber, thereby separating the first aqueous solution from the upstream portion of the main channel, and wherein introducing a second aqueous solution fills the at least one chamber the second portion of the volume of the at least one chamber and forces the non-aqueous fluid out of the at least one chamber through the bypass fluid path.

Another aspect of the disclosure provides a microfluidic device comprising at least one chamber configured to receive at least two different aqueous solutions and a non-aqueous fluid, wherein the at least two different aqueous solutions are selectively introduced into the at least one chamber based on a pressure level of the at least two different aqueous solutions with the non-aqueous fluid being introduced into the at least one chamber before and after each of the at least two different aqueous solutions at varying pressure levels so as to prevent mixing of the at least two different aqueous solutions prior to entering the at least one chamber.

Another aspect of the disclosure provides a method of isolating a mixture comprising at least two different aqueous solutions. The method comprises selectively introducing the at least two different aqueous solutions and a non-aqueous fluid into at least one chamber based on pressure levels of the at least two different aqueous solutions and the non-aqueous fluid so as to prevent mixing of the at least two different aqueous solutions prior to entering the at least one chamber.

In some forms, introducing the at least two different aqueous solutions and the non-aqueous fluid into at least one chamber can include introducing the at least two different aqueous solutions and the non-aqueous fluid into a first chamber of at least two chambers. Introducing the at least two different aqueous solutions and the non-aqueous fluid into the first chamber can comprise: a) introducing a first aqueous solution of the at least two different aqueous solutions into the first chamber at a first pressure; b) subsequent to step a), introducing the non-aqueous fluid into the first chamber at a second pressure; and c) subsequent to step b), introducing a second aqueous solution of the at least two different aqueous solutions into the first chamber at a third pressure. The second pressure can be greater than the first pressure and the third pressure can be greater than the first pressure but less than the second pressure.

Introducing the first aqueous solution into the first chamber at the first pressure can allow the first aqueous solution to pass through a first fluid path having a first capillary valve with a first pressure threshold that is lower than the first pressure. Introducing the non-aqueous fluid into the first chamber at the second pressure can force the first aqueous solution through a second fluid path having a second capillary valve with a second pressure threshold lower than the second pressure, but higher than the first pressure, into a second chamber of the at least two chambers. When the non-aqueous fluid is introduced into the first chamber, it can flow into the first chamber until it reaches a bypass fluid path at which point a first portion of the first chamber can be filled with the non-aqueous fluid. The bypass fluid path can have a bypass capillary valve with an aqueous bypass pressure threshold higher than the second pressure and a non-aqueous bypass pressure threshold lower than the second pressure. Once the non-aqueous fluid has filled the first portion and reaches the bypass valve, the non-aqueous fluid can begin to flow through the bypass fluid path. Introducing the second aqueous solution into the first chamber at the third pressure can force the non-aqueous fluid out of the first chamber, through the bypass fluid path, until the second aqueous solution has replaced the non-aqueous fluid in the first portion of the first chamber.

Another aspect of the disclosure provides a method of isolating a first aqueous solution and a second aqueous solution. The method comprises: a) introducing the first aqueous solution into an inlet of a microfluidic device at a first pressure, the first pressure greater than a first pressure threshold of a first capillary valve and less than a second pressure threshold of a second capillary valve; b) subsequent to step a), introducing a non-aqueous fluid into the inlet of the microfluidic device at a second pressure, the second pressure greater than the second pressure threshold and less than a third pressure threshold of a third capillary valve; c) subsequent to step b), introducing the second aqueous solution into the inlet of the microfluidic device at a third pressure, the third pressure greater than the first pressure threshold and less than the second pressure threshold; and d) subsequent to step c), introducing the non-aqueous fluid into the inlet of the microfluidic device at a fourth pressure, the fourth pressure greater than the first pressure threshold and less than the second pressure threshold.

Another aspect of the disclosure provides a method of isolating a first aqueous solution and a second aqueous solution. The method comprises: a) introducing the first aqueous solution into the inlet of the microfluidic device described herein at a first pressure; b) subsequent to step a), introducing a non-aqueous fluid into the inlet of the microfluidic device at a second pressure, the second pressure greater than the first pressure; c) subsequent to step b), introducing the second aqueous solution into the inlet of the microfluidic device at a third pressure, the third pressure less than the second pressure; d) subsequent to step c), introducing the non-aqueous fluid into the inlet of the microfluidic device at a fourth pressure, the fourth pressure less than the second pressure.

Another aspect of the disclosure provides a method of isolating a first mixture comprising a first aqueous solution and a second aqueous solution and a second mixture comprising a third aqueous solution and the second aqueous solution. The method comprises: a) introducing the first aqueous solution into the inlet of the microfluidic device described herein at a first pressure; b) subsequent to step a), introducing a non-aqueous fluid into the inlet of the microfluidic device at a second pressure, the second pressure greater than the first pressure; c) subsequent to step b), introducing the third aqueous solution into the inlet of the microfluidic device at a third pressure, the third pressure less than the second pressure; d) subsequent to step c), introducing the non-aqueous fluid into the inlet of the microfluidic device at a fourth pressure, the fourth pressure greater than the second pressure; e) subsequent to step d), introducing the second aqueous solution into the inlet of the microfluidic device at a fifth pressure, the fifth pressure greater than the second pressure.

Another aspect of the disclosure provides a method of isolating a mixture comprising at least two different aqueous solutions. The method comprises: a) introducing a first of the at least two different aqueous solutions into at least one chamber at a first pressure; b) subsequent to step a), introducing a non-aqueous fluid into the at least one chamber at a second pressure higher than the first pressure; c) subsequent to step b), introducing a second of the at least two different aqueous solutions into the at least one chamber at a third pressure.

Another aspect of the disclosure provides a method of isolating a mixture comprising at least two different aqueous solutions. The method comprises: a) introducing a first of the at least two different aqueous solutions into at least one chamber; b) subsequent to step a), introducing a non-aqueous fluid into the at least one chamber; c) subsequent to step b), introducing a second of the at least two different aqueous solutions into the at least one chamber.

Another aspect of the disclosure provides a method of isolating a mixture. The method comprises selectively introducing at least two different aqueous solutions into at least one chamber based on a pressure level of the at least two different aqueous solutions.

These and other features, aspects, and advantages of the present invention will become better understood upon consideration of the following detailed description, drawings and appended claims.

DETAILED DESCRIPTION

Figure 1:
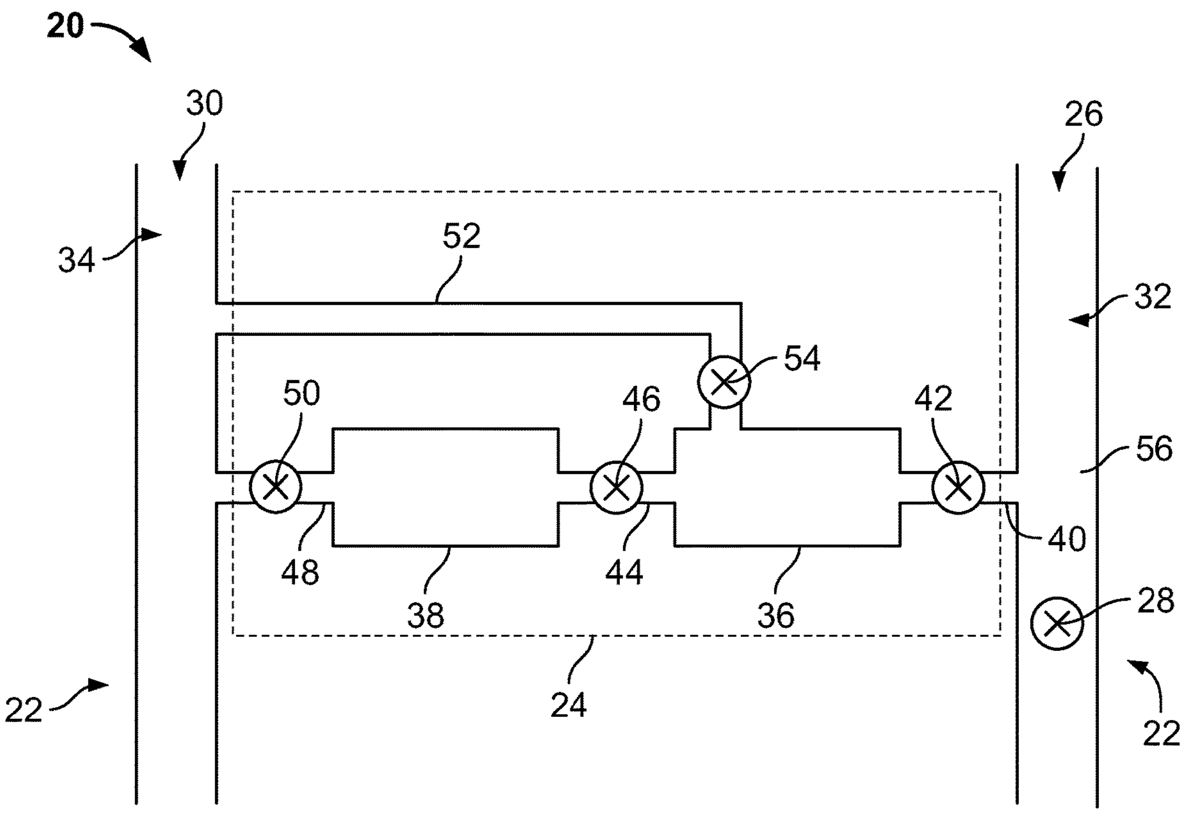
FIG. 1 is a schematic of a microfluidic device.

Before the present invention is described in further detail, it is to be understood that the invention is not limited to the particular aspects described. It is also understood that the terminology used herein is for the purpose of describing particular aspects only, and is not intended to be limiting. The scope of the present invention will be limited only by the claims. As used herein, the singular forms "a", "an", and "the" include plural embodiments unless the context clearly dictates otherwise.

Specific structures, devices and methods relating to isolating droplets are disclosed. It should be apparent to those skilled in the art that many additional modifications beside those already described are possible without departing from the inventive concepts. In interpreting this disclosure, all terms should be interpreted in the broadest possible manner consistent with the context.

Variations of the term "comprising" should be interpreted as referring to elements, components, or steps in a non-exclusive manner, so the referenced elements, components, or steps may be combined with other elements, components, or steps that are not expressly referenced. Aspects referenced as "comprising" certain elements are also contemplated as "consisting essentially of" and "consisting of" those elements.

Numeric ranges disclosed herein are inclusive of the end values. For example, recitation of a value of between 1 and 10 includes the values 1 and 10. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

The various aspects may be described herein in terms of various functional components and processing steps. It should be appreciated that such components and steps may be realized by any number of hardware components configured to perform the specified functions. Unless the context clearly dictates otherwise, aspects of the present disclosure described with respect to devices are applicable to the methods, and vice versa, and aspects described with respect to one method are applicable to other methods.

As used herein, the term "solution" refers to the traditional meaning of solution (in other words, a solvent that has a solute dissolved in it), but should also be interpreted to encompass mixtures, suspensions, neat fluids, and other liquids with or without other components, unless the context clearly dictates otherwise. For clarity, the term "solution" can be used to describe a solvent with a solute dissolved in it, a solvent with a species suspended within it, and a pure fluid.

This disclosure provides microfluidic devices and methods of making and using the same. Systems and methods of the present disclosure utilize capillary valves, and particularly the differential pressure thresholds for aqueous solutions versus other fluids, to isolate droplets of liquid. The isolated droplets can be a single aqueous fluid or solution or a mixture of two or more aqueous fluids or solutions. Each microfluidic device can include a multitude of isolation units. The various isolation units can each have a different configuration in order to provide a multitude of reaction conditions.

Referring to FIG. 1 this disclosure provides a microfluidic device 20. The microfluidic device 20 can include a main channel 22 and a first isolation unit 24. The main channel 22 can include an inlet 26, a first main channel capillary valve 28 having a first main channel pressure threshold, an outlet 30, an upstream portion 32, and a downstream portion 34.

The first isolation unit 24 can include a first chamber 36 and a second chamber 38. Between the upstream portion 32 of the main channel 22 and the first chamber 36 of the first isolation unit 24, there can be a first fluid path 40 providing fluid communication between the upstream portion 32 and the first chamber 36. The first fluid path 40 can include a first capillary valve 42 having a first aqueous pressure threshold.

Between the first chamber 36 of the first isolation unit 24 and the second chamber 38 of the first isolation unit 24, there can be a second fluid path 44 providing fluid communication between the first chamber 36 and the second chamber 38. The second fluid path 44 can include a second capillary valve 46 having a second aqueous pressure threshold. Between the second chamber 38 of the first isolation unit 24 and the downstream portion 34 of the main channel 22 there can be a third fluid path 48 providing fluid communication between the second chamber 38 and the downstream portion 34. The third fluid path 48 can include a third capillary valve 50 having a third aqueous pressure threshold. There can further be a fourth fluid path 52 extending between and providing fluid communication between the first chamber 36 of the first isolation unit 24 and the downstream portion 34 of the main channel 22. The fourth fluid path 52 can include a fourth capillary valve 54 having a fourth aqueous pressure threshold.

In certain applications, the aqueous pressure thresholds of the various capillary valves discussed above can have various relations to one another in order to achieve certain effects. In one aspect, the first aqueous pressure threshold can be lower than the second, third and fourth aqueous pressure thresholds. The second aqueous pressure threshold can be greater than the first aqueous pressure threshold and lower than the third and fourth aqueous pressure thresholds. The third and fourth aqueous pressure thresholds can be equal to each other. The first main channel pressure threshold can be greater than the first aqueous pressure threshold and lower than the second, third, and fourth aqueous pressure thresholds.

Each of the capillary valves 28, 42, 46, 50, 54 discussed above have corresponding non-aqueous pressure thresholds, which tend to be much lower than the corresponding aqueous pressure thresholds. These lower non-aqueous pressure thresholds are due to suitable non-aqueous fluids having significantly lower surface tensions than the surface tensions of typical aqueous solutions.

Each of the aqueous and non-aqueous pressure thresholds are proportional to the diameter of the corresponding capillary valve. Accordingly, in some instances, the first main channel capillary valve 28 may have a diameter between 87 μm and 93 μm. In other instances, the first main channel capillary valve 28 may have a diameter between 80 μm and 100 μm. In some instances, the first capillary valve 42 may have a diameter between 97 μm and 103 μm. In other instances, first capillary valve 42 may have a diameter between 90 μm and 110 μm. In some instances, the second capillary valve 46 may have a diameter between 57 μm and 63 μm. In other instances, the second capillary valve 46 may have a diameter between 50 μm and 70 μm. In some instances, the third capillary valve 50 and/or the fourth capillary valve 54 may have diameters between 27 μm and 33 μm. In other instances, the third capillary valve 50 and/or the fourth capillary valve 54 may have diameters between 20 μm and 40 μm.

In the case that any of the capillary valves 28, 42, 46, 50, 54 described above define a rectangular shape, the width and/or the length of the rectangular shape may be equal to the diameters described above. In some instances, one of the width and the length of the rectangular shape may be equal to the corresponding diameter discussed above, with the other of the width and the length of the rectangular shape being up to three times the corresponding diameter described above.

Figure 10:
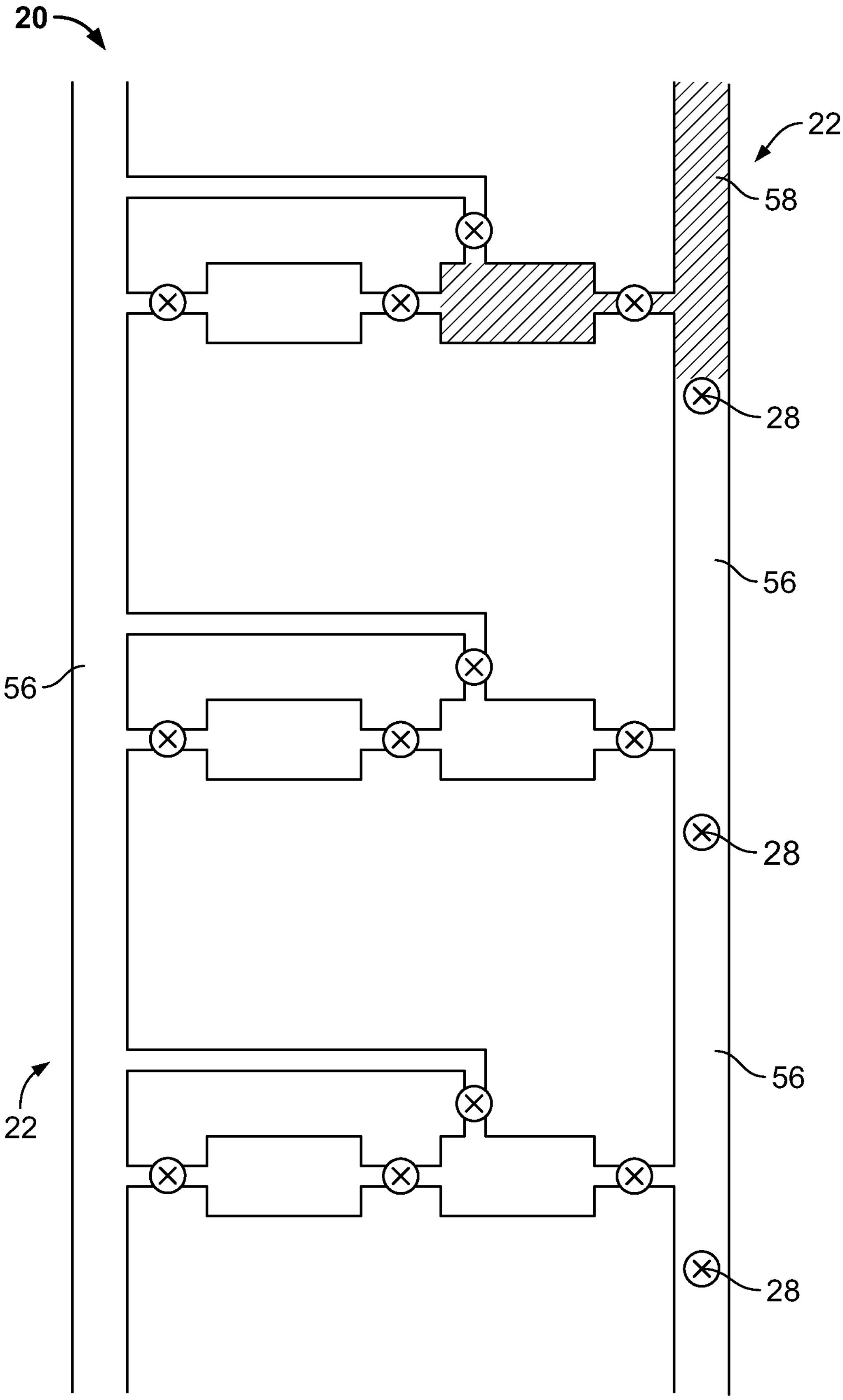
FIG. 10 is a schematic of the microfluidic device of FIG. 1, shown with multiple isolation units and the aqueous solution filling the first chamber of the first isolation unit.
Figure 11:
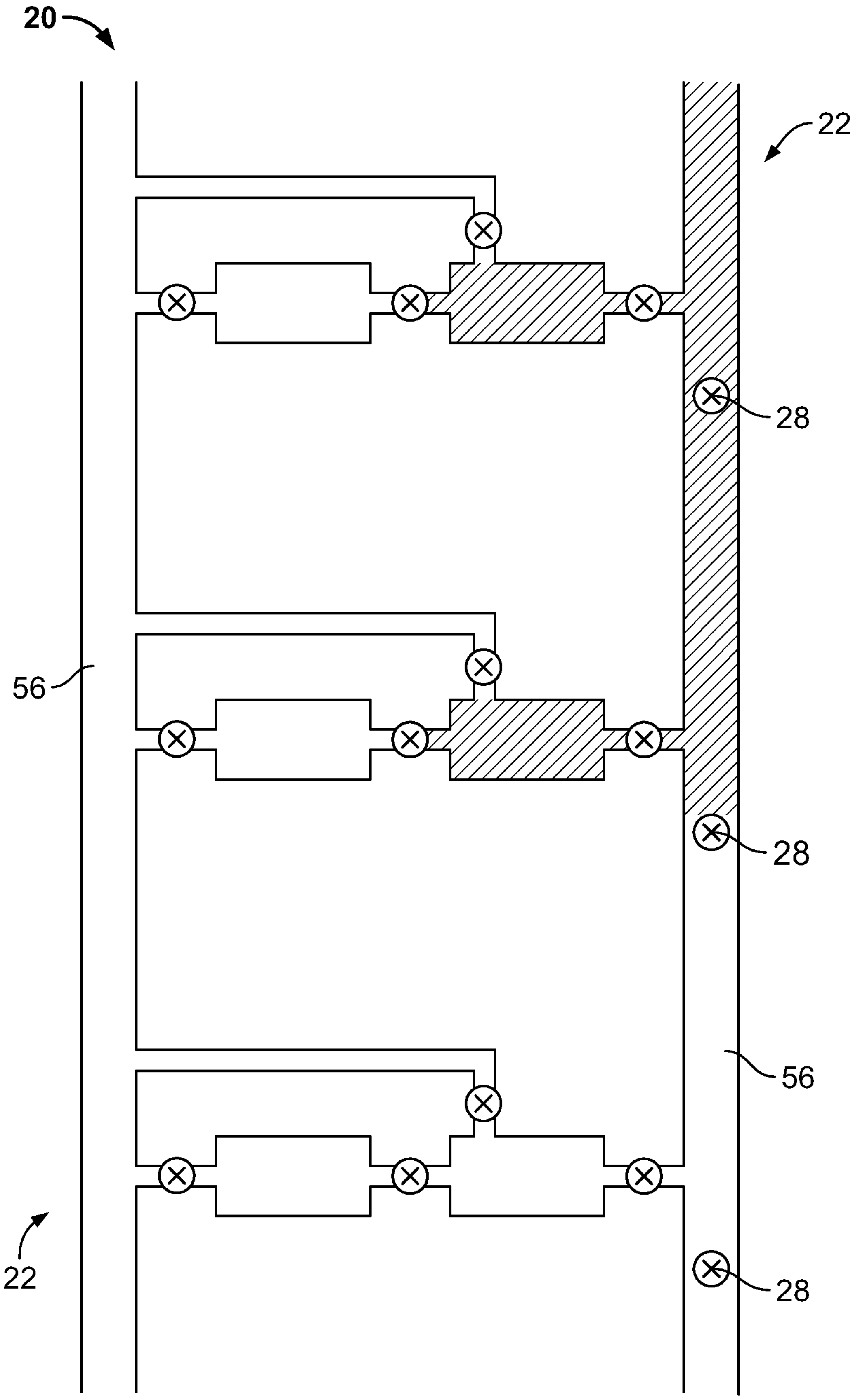
FIG. 11 is the schematic of the microfluidic device of FIG. 10, shown with the aqueous solution filling the first chamber of each of the first isolation unit and the second isolation unit.

It should be appreciated that the microfluidic device 20 can comprise any number of isolation units (e.g. first isolation unit, second isolation unit, third isolation unit, etc.), each in fluid communication with the main channel 22, as shown in FIGS. 10 and 11. The isolation units can be identical or non-identical to achieve certain effects. Further, between the isolation units, the microfluidic device 20 can have corresponding main channel capillary valves (e.g. the first main channel capillary valve 28, a second main channel capillary valve, a third main channel capillary valve, etc.), associated with the isolation units. Each of the main channel capillary valves may have corresponding main channel pressure thresholds (e.g. the first main channel pressure threshold, a second main channel pressure threshold, a third main channel pressure threshold, etc.) within the main channel 22 creating pressure-dependent barriers between each isolation unit, as shown in FIGS. 10 and 11, to allow for the sequential filling of the isolation units, discussed in detail below.

In certain aspects, the device 10 can further include a third chamber and a fifth capillary valve. The third capillary valve 50 can be disposed between the second chamber 38 and the third chamber. The third chamber can be disposed between the third capillary valve 50 and the fifth capillary valve. The fifth capillary valve can be disposed between the third chamber and the downstream portion 34 of the main channel 22. The fifth capillary valve can have a fifth aqueous pressure threshold.

In certain aspects, the first chamber 36, the second chamber 38, the third chamber can have the same or different volumes relative to one another. In certain aspects, the first chamber 36, the second chamber 38, and/or the third chamber can have a volume of between 10 pL and 10 mL, including but not limited to, a volume of between 1 nL and 1 mL, or between 10 nL and 100 nL.

The microfluidic device 20 can have an interior composed of a material selected from a wide range of thermosets. For example, the interior can be composed of a material selected from the group consisting of epoxies, elastomers, such as urethanes, polystyrene, cyclic olefin copolymer, polydimethyl siloxane, Teflon, other materials known to those having ordinary skill in the art to be suitable for microfluidic applications such as those described herein, and combinations thereof.

This disclosure also provides kits including the microfluidic device 20 and a fluid source. The fluid source can be coupled to the inlet 26. The fluid source can be configured to introduce aqueous solutions and non-aqueous fluids to the inlet 26 at variable pressures. The fluid source can be any device capable of moving a fluid through a microfluidic device 20, including but not limited to, various pumps, pipettes, and the like. In certain aspects, the fluid source can be a variable pressure fluid source. In certain aspects, the fluid source can be a plurality of distinct fluid sources that can provide fluid at different pressures. The kits described herein can also include information accompanying the microfluidic device 20 that describes the various pressure thresholds associated with the microfluidic device 20.

Figure 9:
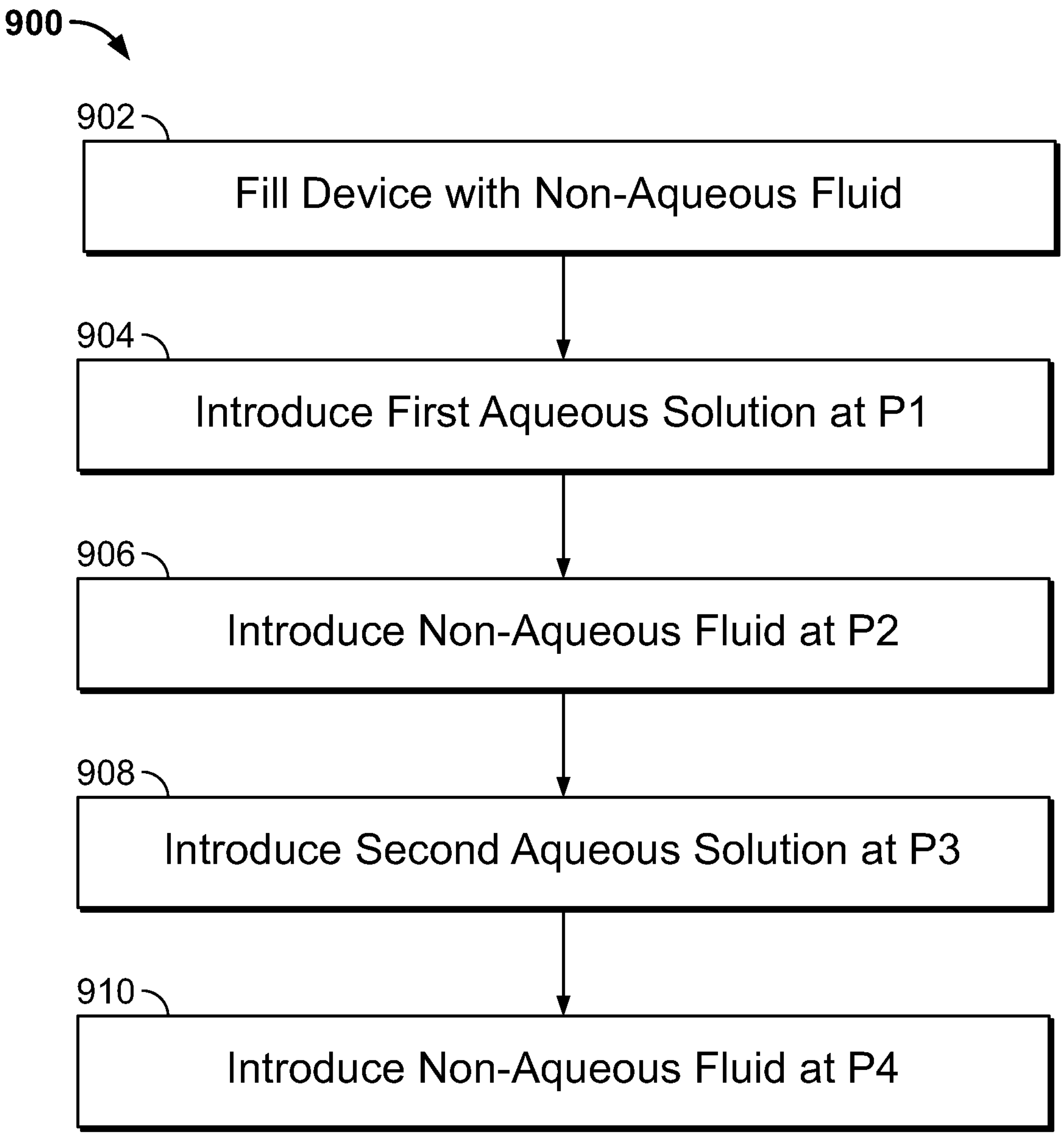
FIG. 9 is a method flowchart for isolating droplet(s) of aqueous mixtures using the microfluidic device shown in FIGS. 1-8.

Referring to FIG. 9, this disclosure provides a method of operation 900 of a microfluidic device 20. At process block 902, the method of operation 900 can include filling the microfluidic device 20 with a non-aqueous fluid 56. At process block 904, the method of operation 900 can include introducing a first aqueous solution 58 into the inlet 26 of the main channel 22 at a first pressure P1. At process block 906, the method of operation 900 can include introducing the non-aqueous fluid 56 into the inlet 26 of the main channel 22 at a second pressure P2. At process block 908, the method of operation 900 can include introducing a second aqueous solution 60 at a third pressure P3. At process block 910, the method of operation 900 can include a fifth method step of introducing the non-aqueous fluid 56 at a fourth pressure P4.

In certain applications, the method steps discussed above can be executed with the first, second, third, and fourth pressures P1, P2, P3, P4 corresponding to the various pressure thresholds of the capillary valves 42, 46, 50, 54 of the microfluidic device 20 to achieve certain effects.

Figure 2:
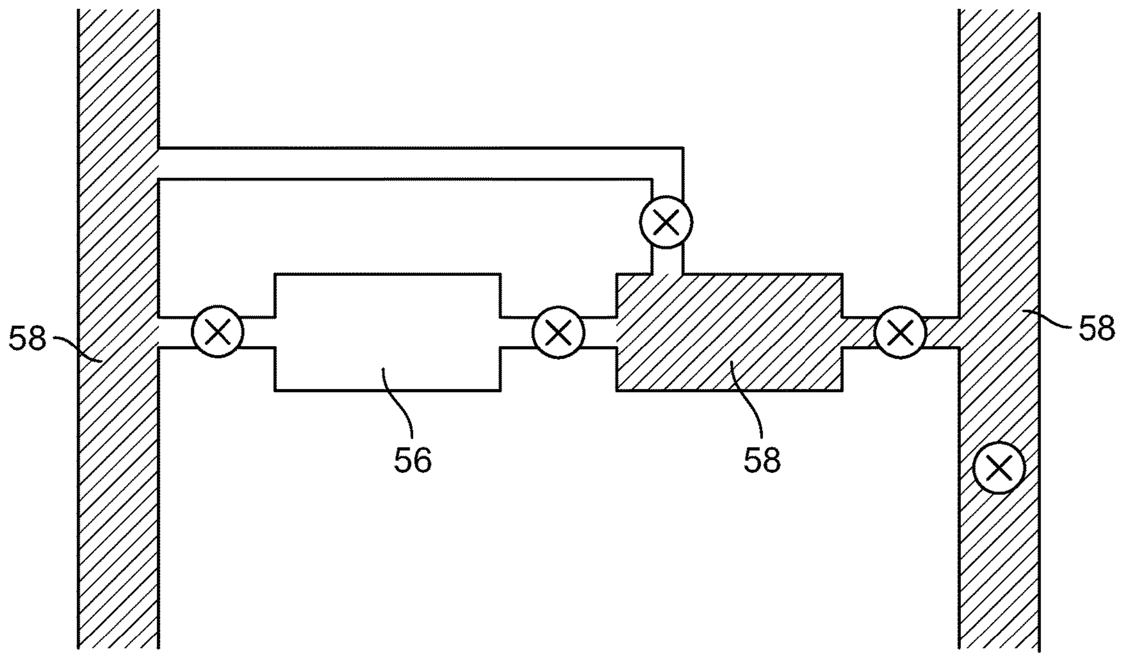
FIG. 2 is the schematic of the microfluidic device of FIG. 1, shown with the first aqueous solution filling the main channel and the first chamber of the first isolation unit.

In an aspect, FIGS. 1-6 illustrate the microfluidic device 20 at various time slices during execution of the method of operation 900. During the first method step, the microfluidic device 20 can be filled with the non-aqueous fluid 56. The non-aqueous fluid 56 can be selected from a group consisting of a gaseous fluid, an oil, a liquid metal (for example, mercury or gallium), and combinations thereof. As shown in FIG. 2, during the second method step, a first aqueous solution 58 can be introduced into the inlet 26 of the main channel 22 at a first pressure P1, which is greater than the first aqueous pressure threshold of the first capillary valve 42. The first aqueous solution 58 flows from the inlet 26 through at least part of the upstream portion 32, then the first aqueous solution 58 flows through the first fluid path 40 (passing through the first capillary valve 42), and begins to fill the first chamber 36 of the first isolation unit 24. As the first aqueous solution 58 flows into the first chamber 36 at the first pressure P1, the non-aqueous fluid 56 flows out of the first chamber 36 through the second and fourth fluid paths 44, 52 because the second and fourth capillary valves 46, 54 have second and fourth non-aqueous pressure thresholds which are lower than the first pressure P1. As the first aqueous solution 58 fills the first chamber 36, effectively replacing the non-aqueous fluid 56, the first aqueous solution 58 does not flow through the second and fourth fluid paths 44, 52 because the first pressure P1 is lower than the second and fourth aqueous pressure thresholds of the second and fourth capillary valves 46, 54.

Additionally, in some aspects the main channel 22 can include the main channel capillary valve 28. The main channel capillary valve 28 can have a main channel pressure threshold that is greater than the first aqueous pressure threshold, but lower than the first pressure P1. Due to the higher main channel pressure threshold in these aspects, the first aqueous solution 58 flows first into the first chamber 36 of the first isolation unit 24, as shown in FIG. 10. When the first chamber 36 is filled, the first aqueous solution 58 flows through the main channel capillary valve 28, through the main channel 22, either out of the main channel 22, or to a second isolation unit, as shown in FIG. 11. In this regard, multiple isolation units separated by multiple main channel capillary valves can filled sequentially.

Further, it will be appreciated by those skilled in the art that with multiple isolation units being filled sequentially, it is possible to introduce a predetermined amount of the first aqueous solution 58 into the main channel 22, such that the first aqueous solution 58 does not fill all of the multiple first chambers 36 of the multiple isolation units. For example, if the first chamber 36 of each isolation unit holds 10 nL of liquid, and there are ten isolation units in the microfluidic device, if 50 nL of the first aqueous solution 58 are introduced into the main channel 22, the first aqueous solution 58 will fill the first chambers 36 of the first five isolation units, with the remaining five isolation units still containing the non-aqueous fluid 56. Additionally, after the first aqueous solution 58 has filled the first chambers 36 of the first five isolation units, 50 nL of a third aqueous solution can be introduced into the main channel 22. In this case, the first aqueous solution 58 can block the third aqueous solution from entering the first chambers 36 of the first five isolation units. Then the third aqueous solution can sequentially fill the first chambers 36 of the remaining five isolation units.

To introduce multiple aqueous solutions and non-aqueous fluids into the microfluidic device 20, a tube containing pre-measured amounts of the various liquids may be used. The tube can contain a multitude of varying aqueous solutions separated by non-aqueous fluids, such that the first chambers 36 of the various isolation units can be filled with a multitude of varying aqueous solutions, as described above.

Figure 3:
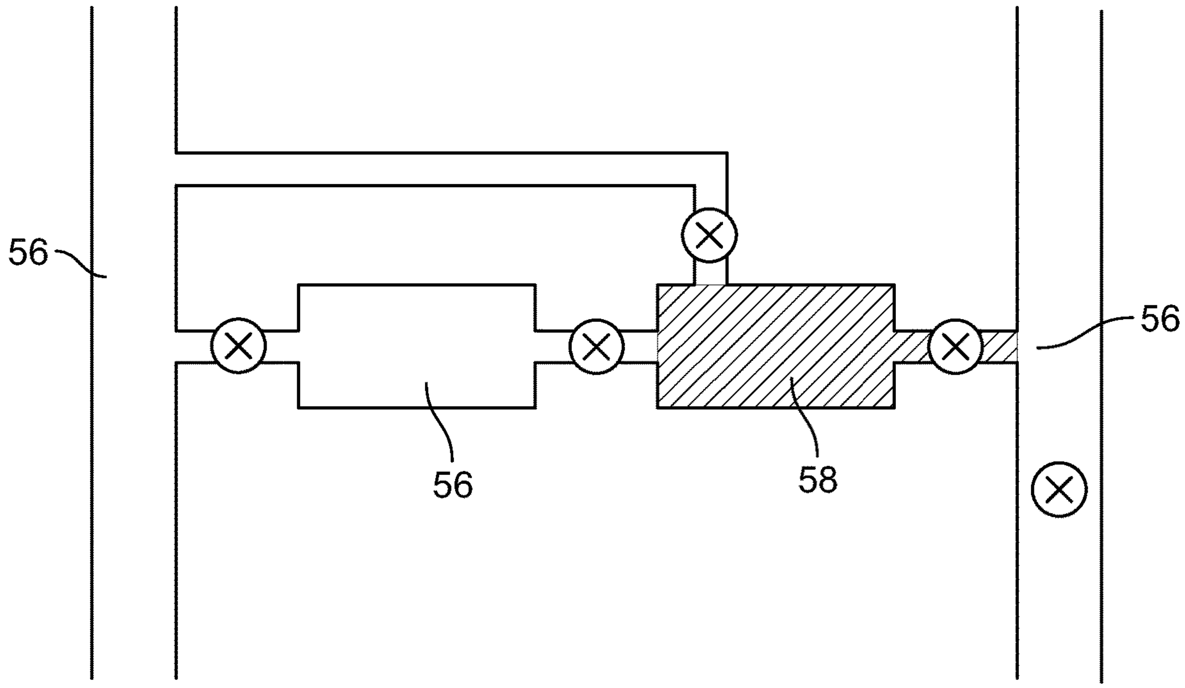
FIG. 3 is the schematic of the microfluidic device of FIG. 1, shown with the first aqueous solution filling the first chamber of the first isolation unit.

As shown in FIG. 3, during the third method step, the non-aqueous fluid 56 is introduced into the inlet 26 of the main channel 22 at a second pressure P2, which is greater than the first and second aqueous pressure thresholds, but lower than the third and fourth aqueous pressure thresholds. As the non-aqueous fluid 56 flows through the inlet 26 and the upstream portion 32 it pushes the first aqueous solution 58 through the main channel 22. The non-aqueous fluid 56 continues to push the first aqueous solution 58 past the first fluid path 40, through the first main channel capillary valve 28, through the downstream portion 34, and out of the outlet 30 of the main channel 22. At this point, the non-aqueous fluid 56 completely fills the main channel 22, effectively purging the first aqueous solution 58 from the main channel 22.

Figure 4:
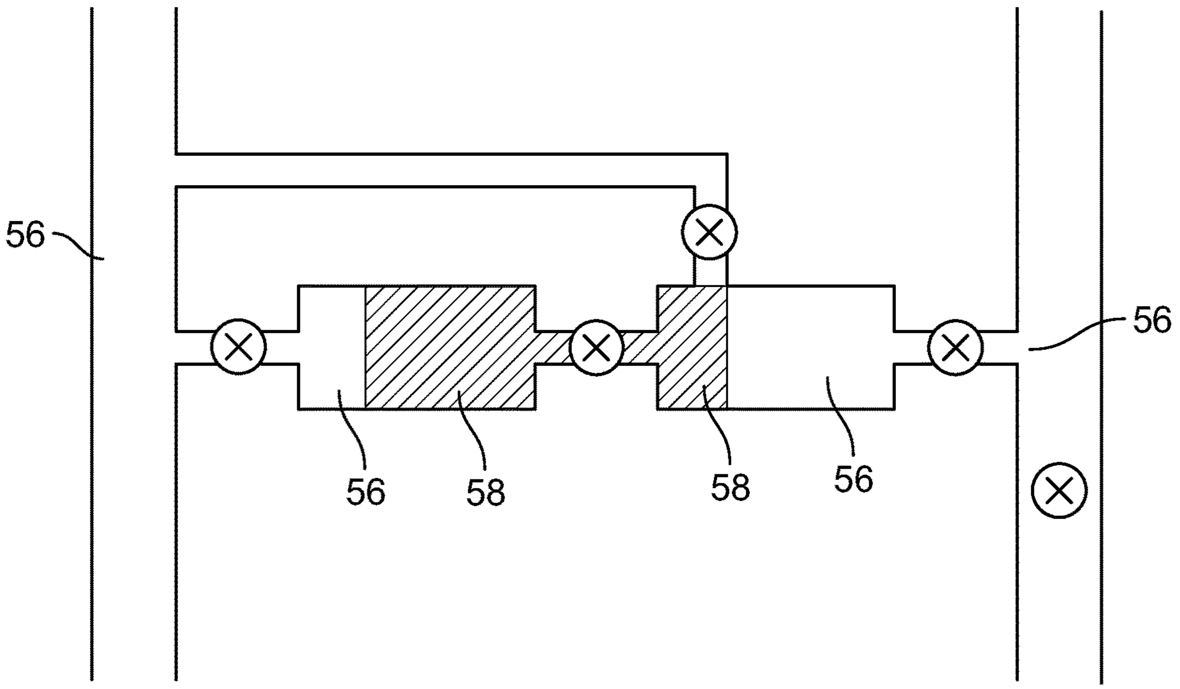
FIG. 4 is the schematic of the microfluidic device of FIG. 1, shown with the first aqueous solution partially filling each of the first and second chambers of the first isolation unit.

As shown in FIG. 4, once the non-aqueous fluid 56 purges the main channel 22 of the first aqueous solution 58, it begins to flow into the first chamber 36 of the first isolation unit 24. As the non-aqueous fluid 56 flows into the first chamber 36 at the second pressure P2, the first aqueous solution 58 begins to flow through the second fluid path 44 (passing through the second capillary valve 46), and into the second chamber 38. The non-aqueous fluid 56 flows through the first fluid path 40 (passing through the first capillary valve 42) and continues to push the first aqueous solution 58 into the second chamber 38 until the non-aqueous fluid 56 reaches the fourth fluid path 52. The fourth non-aqueous pressure threshold of the fourth capillary valve 54 is lower than the second pressure P2, therefore the non-aqueous fluid 56 is allowed to pass through the fourth capillary valve 54, through the fourth fluid path 52, and into the downstream portion 34 of the main channel 22. For this reason, the non-aqueous fluid 56 does not continue pushing the first aqueous solution 58 once it reaches the fourth fluid path 52.

Figure 5:
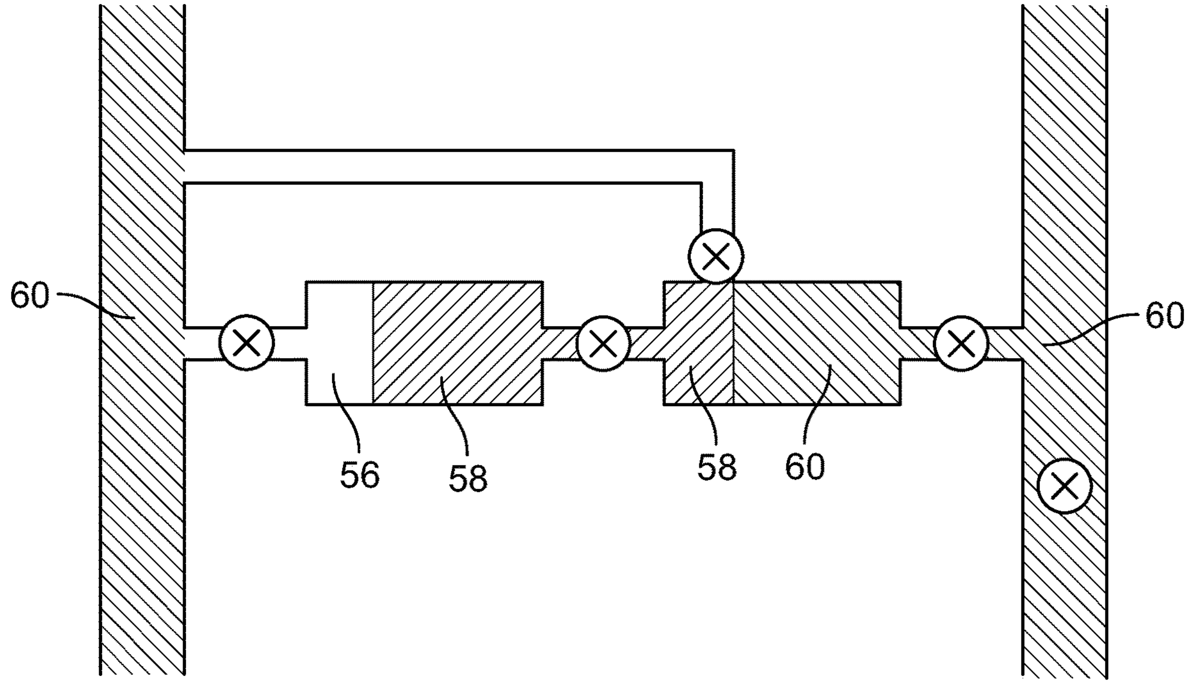
FIG. 5 is the schematic of the microfluidic device of FIG. 1, shown with the first aqueous solution partially filling each of the first and second chambers of the first isolation unit, and the second aqueous solution filling the main channel and the rest of the first chamber of the first isolation unit.

As shown in FIG. 5, during the fourth method step, a second aqueous solution 60 is introduced into the inlet 26 of the main channel 22 at a third pressure P3, which is greater than the first aqueous pressure threshold, but lower than the second, third, and fourth aqueous pressure thresholds. The second aqueous solution 60 flows from the inlet 26, through the upstream portion 32, through the downstream portion 34, and out of the outlet 30, completely filling the main channel 22. Again, because the first main channel pressure threshold of the first main channel capillary valve 28 is greater than the first aqueous pressure threshold, the second aqueous solution 60 flows through the first fluid path 40 (passing through the first capillary valve 42), and into the first chamber 36 of the first isolation unit 24 before passing through the first main channel capillary valve 28 to fill the rest of the main channel 22.

As the second aqueous solution 60 flows into the first chamber 36, the non-aqueous fluid 56 is continuously allowed to flow through the fourth fluid path 52 (passing through the fourth capillary valve 54), into the downstream portion 34 of the main channel 22. Once the second aqueous solution 60 reaches the fourth fluid path 52, it has effectively replaced the non-aqueous fluid 56 within the first chamber 36. The first and second aqueous solutions 58, 60 do not flow through the second and fourth fluid paths 44, 52 because the second and fourth aqueous pressure thresholds are greater than the third pressure P3. At this point the second chamber 38 is partially filled by the first aqueous solution 58, and the first chamber 36 is completely filled, partially by the first aqueous solution 58 and partially by the second aqueous solution 60.

In the illustrated aspect, the second aqueous solution 60 fills approximately eighty percent of the first chamber 36 with the rest of the first chamber 36 being filled by the first aqueous solution 58. In other aspects, the second aqueous solution 60 could fill between more or less than eighty percent of the first chamber 36 to achieve a desired concentration of the second aqueous solution 60 relative to the first aqueous solution 58.

The desired concentration of the second aqueous solution 60 relative to the first aqueous solution 58 may be achieved by positioning the fourth fluid path 52 within the first chamber 36 between the first and second fluid paths 40, 44 such that when the non-aqueous fluid 56 flows into the first chamber 36 at the second pressure P2, during the third method step, it fills a desired percentage of the first chamber 36 before beginning to flow through the fourth fluid path 52. The desired percentage of the first chamber 36 filled by the non-aqueous fluid 56 is then replaced by the second aqueous solution 60, during the fourth method step, giving the first chamber 36 the desired concentration of the second aqueous solution 60 relative to the first aqueous solution 58.

Additionally, it will be appreciated by those skilled in the art that the fourth fluid path 52 may be positioned within the second chamber 38 or the third chamber, instead of the first chamber 36, depending on the intended use, to achieve certain affects.

Figure 6:
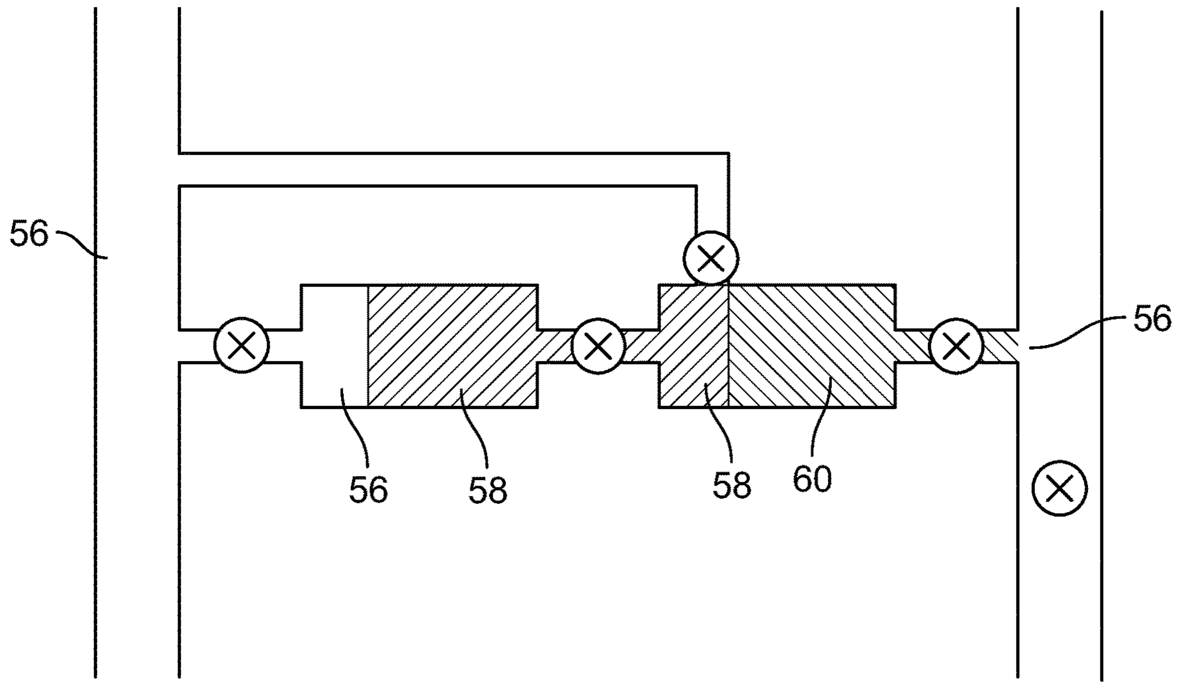
FIG. 6 is the schematic of the microfluidic device of FIG. 1, shown with the first aqueous solution partially filling each of the first and second chambers of the first isolation unit, and the second aqueous solution filling the rest of the first chamber of the first isolation unit.

As shown in FIG. 6, during the fifth method step, the non-aqueous fluid 56 is introduced into the inlet 26 of the main channel 22 at a fourth pressure P4. The fourth pressure P4 is greater than the first aqueous pressure threshold, but less than the second, third, and fourth aqueous pressure thresholds. The non-aqueous fluid 56 flows from the inlet 26, through the upstream portion 32, through the downstream portion 34, and out of the outlet 30, completely filling the main channel 22 and effectively purging the main channel 22 of the second aqueous solution 60. Once the non-aqueous fluid 56 fills the main channel 22, it does not begin to flow into the first fluid path 40 because the fourth pressure P4 is lower than the second and fourth aqueous pressure thresholds, therefore the first and second aqueous solutions 58, 60 are unable to flow through the second and fourth fluid paths 44, 52, and effectively block the non-aqueous fluid 56 from entering the first chamber 36.

In an aspect, FIGS. 1-6 illustrate the microfluidic device 20 at various time slices during execution of the method of operation 900. In this aspect the first through fifth method steps happen as described above with a slight variation to the second method step, as discussed below.

In this aspect, the main channel 22 does not include the first main channel capillary valve 28 (or any other main channel capillary valves). As such, during the second method step, the first aqueous solution 58 can be introduced into the inlet 26 of the main channel 22 at the first pressure P1, which is greater than the first aqueous pressure threshold of the first capillary valve 42. The first aqueous solution 58 flows from the inlet 26 through the upstream portion 32, through the downstream portion 34, and out of the outlet 30, completely filling the main channel 22. Then, once the main channel 22 is filled with the first aqueous solution 58 at the first pressure P1, the first aqueous flows through the first fluid path 40 (passing through the first capillary valve 42), and begins to fill the first chamber 36 of the first isolation unit 24. From this point on, the second through fifth method steps occur as described above.

In an aspect, FIGS. 1-5, 7, and 8 illustrate the microfluidic device 20 at various time slices during execution of the method of operation 900. In this aspect, the first through third method steps (corresponding to FIGS. 1-4) happen as described above.

Figure 7:
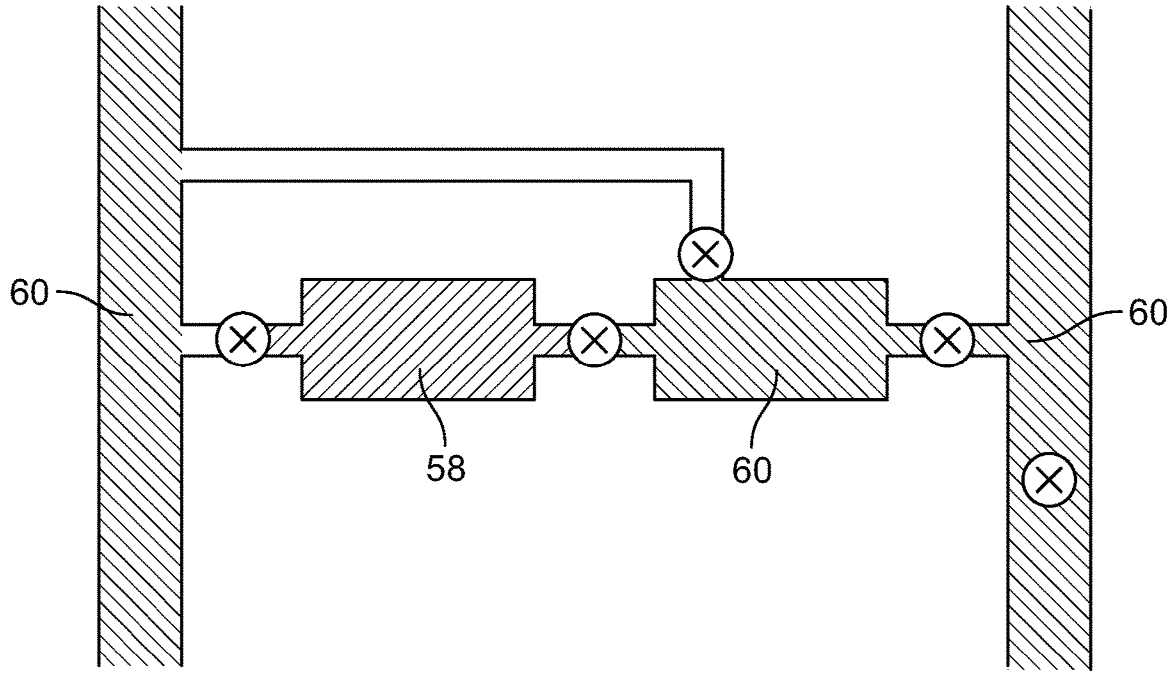
FIG. 7 is the schematic of the microfluidic device of FIG. 1, shown with the first aqueous solution filling the second chamber of the first isolation unit, and the second aqueous solution filling main channel and the first chamber of the first isolation unit.

As shown in FIGS. 5 and 7, during the fourth method step, the second aqueous solution 60 is introduced into the inlet 26 of the main channel 22 at the third pressure P3. In this aspect, the third pressure P3 is greater than both the first and second aqueous pressure thresholds, but lower than the third and fourth aqueous pressure thresholds. The second aqueous solution 60 flows from the inlet 26, through the upstream portion 32, through the downstream portion 34, and out of the outlet 30, completely filling the main channel 22. Once the main channel 22 is filled with the second aqueous solution 60 at the third pressure P3, the second aqueous solution 60 flows through the first fluid path 40 (passing through the first capillary valve 42), and into the first chamber 36 of the first isolation unit 24. As the second aqueous solution 60 flows into the first chamber 36, the non-aqueous fluid 56 is continuously allowed to flow through the fourth fluid path 52 (passing through the fourth capillary valve 54), into the downstream portion 34 of the main channel 22. Once the second aqueous solution 60 reached the fourth fluid path 52, it has effectively replaced the non-aqueous fluid 56 within the first chamber 36. At this point, because the third pressure P3 is greater than the second aqueous pressure threshold, the first aqueous solution 58 is allowed to pass through the second fluid path 44 (through the second capillary valve 46), and further enter the second chamber 38 of the first isolation unit 24. Once the second chamber 38 is completely filled by the first aqueous solution 58, or a mixture of the first and second aqueous solutions 58, 60 as discussed below, the first isolation unit 24 is completely filled, and neither the first aqueous solution 58 nor the second aqueous solution 60 are allowed to flow through the third or fourth fluid paths 48, 52 because the third pressure P3 is lower than both the third and fourth aqueous pressure thresholds.

In the illustrated aspect, the first aqueous solution 58 fills approximately one hundred percent of the second chamber 38. In other aspects, the first aqueous solution 58 could fill less than one hundred percent of the second chamber 38, with the rest of the second chamber 38 being filled by the second aqueous solution 60, to achieve a desired concentration of the first aqueous solution 58 relative to the second aqueous solution 60.

In the illustrated aspect, the second aqueous solution 60 fills approximately one hundred percent of the first chamber 36. In other aspects, the second aqueous solution 60 could fill less than one hundred percent of the first chamber 36, with the rest of the first chamber 36 being filled by the first aqueous solution 58, to achieve a desired concentration of the second aqueous solution 60 relative to the first aqueous solution 58.

During the fourth method step, after the second aqueous solution 60 has effectively replaced the non-aqueous fluid 56 within the first chamber 36, and pushed the first aqueous solution 58 until the second chamber 38 is completely filled, the volume of the first chamber 36 relative to the second chamber 38 ultimately determines the concentration of the first and second aqueous solutions 58, 60 relative to one another within the first and second chambers 36, 38. For example, if the first chamber 36 is two-hundred percent of the volume of the second chamber 38, after the fourth method step, the second chamber 38 would be completely filled with the first aqueous solution 58, and the first chamber 36 would be filled with a mixture composed of fifty percent the first aqueous solution 58 and fifty percent the second aqueous solution 60. Alternatively, if the first chamber 36 is fifty percent of the volume of the second chamber 38, after the fourth method step, the first chamber 36 would be completely filled with the second aqueous solution 60, and the second chamber 38 would be filled with a mixture composed of fifty percent the first aqueous solution 58 and fifty percent the second aqueous solution 60. As such, in this aspect, the desired concentrations of the first and second aqueous solutions 58, 60 relative to one another within the first and second chambers 36, 38 may be achieved by sizing the first and second chambers 36, 38 accordingly.

Figure 8:
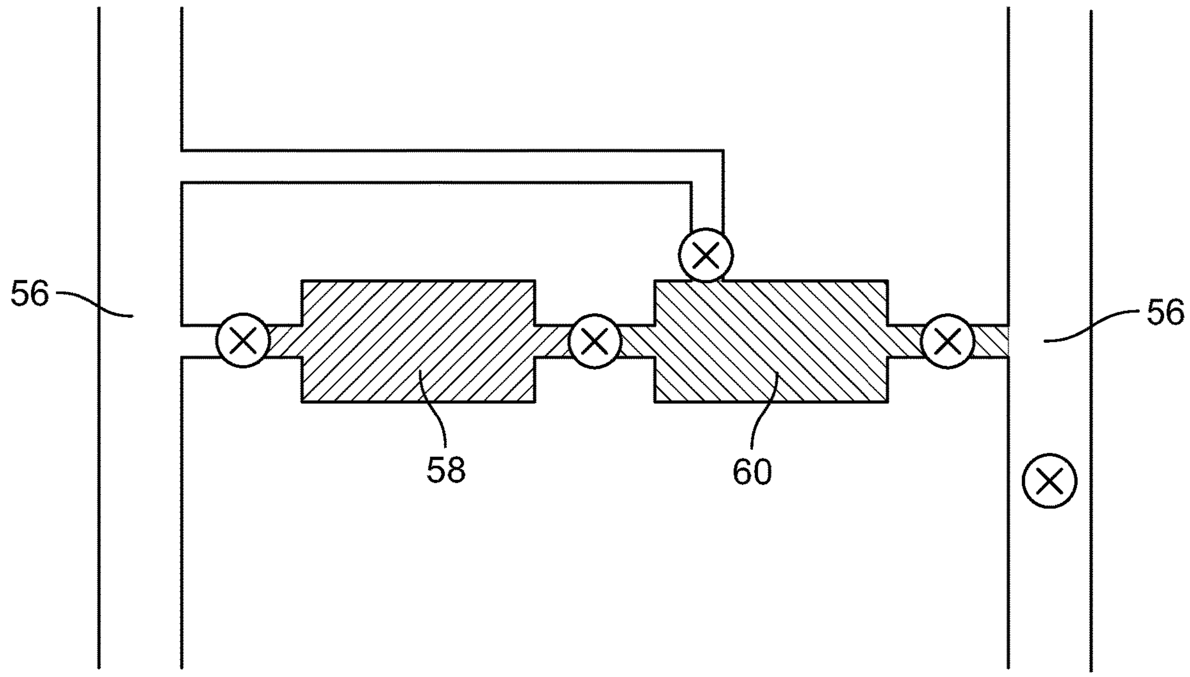
FIG. 8 is the schematic of the microfluidic device of FIG. 1, shown with the first aqueous solution filling the second chamber of the first isolation unit, and the second aqueous solution filling the first chamber of the first isolation unit.

As shown in FIG. 8, during the fifth method step, the non-aqueous fluid 56 is introduced into the inlet 26 of the main channel 22 at the fourth pressure P4. Again, the fourth pressure P4 is greater than the first and second aqueous pressure thresholds, but less than the third and fourth aqueous pressure thresholds. The non-aqueous fluid 56 flows from the inlet 26, through the upstream portion 32, through the downstream portion 34, and out of the outlet 30, completely filling the main channel 22 and effectively purging the main channel 22 of the second aqueous solution 60. Once the non-aqueous fluid 56 fills the main channel 22, it does not begin to flow into the first fluid path 40 because the fourth pressure P4 is lower than the third and fourth aqueous pressure thresholds, therefore the first and second aqueous solutions 58, 60 are unable to flow through the third and fourth fluid paths 48, 52, and effectively block the non-aqueous fluid 56 from entering the first chamber 36.

After the fifth method step, the first isolation unit 24 can contain an isolated droplet of the aqueous mixture composed of the first aqueous solution 58 and the second aqueous solution 60 with the desired concentration of the first aqueous solution 58 relative to the second aqueous solution 60.

There are several methods of making the above described microfluidic device 20. The microfluidic device 20 can, for example, be made as a two piece device having a body, including the various chambers and fluid paths described above formed into an exterior surface of the body, and a cover that is then affixed or coupled to the body, such that the various chambers and fluid paths are sealed. The body can be formed using a single-step process. For example, the body can be formed using injection molding, compression molding, or any other suitable single-step process. The body can also be formed using a two-step process. For example, the body can be formed by first forming a blank structure using extrusion, injection molding, compression molding, or any other suitable process, and then forming the various chambers and fluid paths into the exterior surface through laser etching, milling, chemical etching, or any other suitable subtractive manufacturing process.

The disclosure therefore provides a microfluidic device comprising at least one isolation unit and at least one capillary valve. The at least one isolation unit has at least one chamber. The at least one chamber configured to receive at least two different aqueous solutions. The at least one capillary valve is configured to allow for the at least two different aqueous solutions to be introduced into the at least one chamber without mixing prior to entering the at least one chamber based at least in part on pressure levels of the at least two different aqueous solutions.

In some forms, a relative volume of each of the at least two different aqueous solutions when introduced into the at least one chamber is determined by a location of a bypass capillary valve within the at least one chamber. The at least one chamber can be at least two chambers. The microfluidic device can further comprise a main channel, wherein the at least one chamber is in fluid communication with the main channel via the at least one capillary valve. The main channel can comprise an inlet, an outlet, an upstream portion, and a downstream portion. The upstream portion can be disposed between the inlet and the downstream portion, and the downstream portion can be disposed between the upstream portion and the outlet. The at least one capillary valve can include a first capillary valve, a second capillary valve, and a third capillary valve.

The microfluidic device can further comprise a first fluid path, a second fluid path, a third fluid path, and a bypass fluid path. The first fluid path can provide fluid communication between a first chamber of the at least two chambers and the upstream portion of the main channel. The first fluid path can include the first capillary valve. The first capillary valve can have a first pressure threshold. The second fluid path can provide fluid communication between the first chamber and a second chamber of the at least two chambers. The second fluid path can include the second capillary valve. The second capillary valve can have a second pressure threshold. The third fluid path can provide fluid communication between the second chamber and the downstream portion of the main channel. The third fluid path can include the third capillary valve. The third capillary valve can have a third pressure threshold. The bypass fluid path can provide fluid communication between one of the at least two chambers and the downstream portion of the main channel. The bypass fluid path can include the bypass capillary valve having a bypass pressure threshold. The bypass fluid path can provide fluid communication between the first chamber and the downstream portion. The bypass fluid path can connect to the first chamber upstream of the second fluid path. The bypass fluid path can provide fluid communication between the second chamber and the downstream portion.

The bypass fluid path can connect to the second chamber upstream of the third fluid path. The bypass fluid path can be positioned at a location wherein introducing a first aqueous solution of the at least two different aqueous solutions fills a first portion of the at least two chambers and subsequently introducing a non-aqueous fluid fills a second portion of the at least two chambers, thereby separating the first aqueous solution from the upstream portion of the main channel, and wherein introducing a second aqueous solution of the at least two different aqueous solutions fills the second portion of the at least two chambers and forces the non-aqueous fluid out of the at least two chambers through the bypass fluid path.

In some cases, the second pressure threshold can be greater than the first pressure threshold, and the third pressure threshold can be greater than the second pressure threshold, and the bypass pressure threshold can be greater than the second pressure threshold but less than the third pressure threshold.

The at least two chambers can further be at least three chambers including a first chamber, a second chamber, and a third chamber. In this case, the microfluidic device can comprise a first fluid path, a second fluid path, a third fluid path, a fourth fluid path, and a bypass fluid path. The first fluid path can provide fluid communication between the first chamber of the at least three chambers and the upstream portion of the main channel. The first fluid path can include the first capillary valve. The first capillary valve can have a first pressure threshold. The second fluid path can provide fluid communication between the first chamber and a second chamber of the at least three chambers. The second fluid path can include the second capillary valve. The second capillary valve can have a second pressure threshold. The third fluid path can provide fluid communication between the second chamber and the third chamber of the at least three chambers. The third fluid path can include the third capillary valve. The third capillary valve can have a third pressure threshold. The fourth fluid path can provide fluid communication between the third chamber and the downstream portion of the main channel. The fourth fluid path can include a fourth capillary valve. The fourth capillary valve can have a fourth pressure threshold. The bypass fluid path can provide fluid communication between one of the at least three chambers and the downstream portion of the main channel. The bypass fluid path can include the bypass capillary valve having a bypass pressure threshold.

In some cases, the second pressure threshold can be greater than the first pressure threshold, and the third pressure threshold can be greater than the second pressure threshold, and the fourth pressure threshold can be greater than the third pressure threshold, and the bypass pressure threshold can be greater than the third pressure threshold and less than the fourth pressure threshold.

The bypass fluid path can provide fluid communication between the first chamber and the downstream portion. The bypass fluid path can connect to the first chamber upstream of the second fluid path. The bypass fluid path can provide fluid communication between the second chamber and the downstream portion. The bypass fluid path can connect to the second chamber upstream of the third fluid path. The bypass fluid path can provide fluid communication between the third chamber and the downstream portion. The bypass fluid path can connect to the third chamber upstream of the fourth fluid path. The bypass fluid path can be positioned at a location wherein introducing a first aqueous solution of the at least two different aqueous solutions fills a first portion of the at least three chambers and subsequently introducing a non-aqueous fluid fills a second portion of the at least three chambers, thereby separating the first aqueous solution from the upstream portion of the main channel, and wherein introducing a second aqueous solution of the at least two different aqueous solutions fills the second portion of the at least three chambers and forces the non-aqueous fluid out of the at least three chambers through the bypass fluid path.

The first chamber can have a first volume and the second chamber can have a second volume that is larger than the first volume. The first chamber can have a first volume and the second chamber can have a second volume that is smaller than the first volume. The first chamber can have a first volume and the second chamber can have a second volume that is larger than the first volume. The first chamber can have a first volume and the second chamber can have a second volume that is smaller than the first volume. The third chamber can have a third volume that is larger than the second volume. The third chamber can have a third volume that is smaller than the second volume. The third chamber can have a third volume that is larger than the first volume. The third chamber can have a third volume that is smaller than the first volume. The at least one isolation unit can be at least four isolation units.

The disclosure additionally provides a microfluidic device comprising at least one chamber configured to receive at least two different aqueous solutions and a non-aqueous fluid, wherein the at least two different aqueous solutions and the non-aqueous fluid are selectively introduced into the at least one chamber based on pressure levels of the at least two different aqueous solutions and the non-aqueous fluid so as to prevent mixing of the at least two different aqueous solutions prior to entering the at least one chamber.

The disclosure further provides a microfluidic device comprising at least one chamber configured to receive at least two different aqueous solutions, wherein the at least two different aqueous solutions are selectively introduced into the at least one chamber based on a pressure level of the at least two different aqueous solutions.

The disclosure further still provides a microfluidic device comprising a main channel and an isolation unit. The main channel comprises an inlet, an outlet, an upstream portion, and a downstream portion. The isolation unit comprises a first chamber, a second chamber, a first fluid path, a second fluid path, a third fluid path, and a bypass fluid path. The first fluid path provides fluid communication between the upstream portion of the main channel and the first chamber and includes a first capillary valve. The second fluid path provides fluid communication between the first chamber and the second chamber and includes a second capillary valve. The third fluid path provides fluid communication between the second chamber and the downstream portion of the main channel and includes a third capillary valve. The bypass fluid path provides fluid communication between one of the first and second chambers and the downstream portion of the main channel and includes a bypass capillary valve.

The disclosure also provides a microfluidic device comprising a main channel and an isolation unit. The main channel comprises an inlet, an outlet, an upstream portion, and a downstream portion. The isolation unit comprises at least one chamber, a first fluid path, a second fluid path, and a bypass fluid path. The first fluid path provides fluid communication between the upstream portion of the main channel and the at least one chamber and includes a first capillary valve. The second fluid path provides fluid communication between the at least one chamber and the downstream portion of the main channel and includes a second capillary valve. The bypass fluid path provides fluid communication between the at least one chamber and the downstream portion of the main channel and includes a bypass capillary valve, the bypass fluid path being positioned at a location wherein introducing a first aqueous solution fills the at least one chamber a first portion of the at least one chamber and the bypass fluid path allows a non-aqueous fluid to fill a second portion of the at least one chamber, thereby separating the first aqueous solution from the upstream portion of the main channel, and wherein introducing a second aqueous solution fills the at least one chamber the second portion of the volume of the at least one chamber and forces the non-aqueous fluid out of the at least one chamber through the bypass fluid path.

The disclosure additionally provides a microfluidic device comprising at least one chamber configured to receive at least two different aqueous solutions and a non-aqueous fluid, wherein the at least two different aqueous solutions are selectively introduced into the at least one chamber based on a pressure level of the at least two different aqueous solutions with the non-aqueous fluid being introduced into the at least one chamber before and after each of the at least two different aqueous solutions at varying pressure levels so as to prevent mixing of the at least two different aqueous solutions prior to entering the at least one chamber.

The disclosure further provides a method of isolating a mixture comprising at least two different aqueous solutions. The method comprises selectively introducing the at least two different aqueous solutions and a non-aqueous fluid into at least one chamber based on pressure levels of the at least two different aqueous solutions and the non-aqueous fluid so as to prevent mixing of the at least two different aqueous solutions prior to entering the at least one chamber.

In some forms, introducing the at least two different aqueous solutions and the non-aqueous fluid into at least one chamber can include introducing the at least two different aqueous solutions and the non-aqueous fluid into a first chamber of at least two chambers. Introducing the at least two different aqueous solutions and the non-aqueous fluid into the first chamber can comprise: a) introducing a first aqueous solution of the at least two different aqueous solutions into the first chamber at a first pressure; b) subsequent to step a), introducing the non-aqueous fluid into the first chamber at a second pressure; and c) subsequent to step b), introducing a second aqueous solution of the at least two different aqueous solutions into the first chamber at a third pressure. The second pressure can be greater than the first pressure and the third pressure can be greater than the first pressure but less than the second pressure.

Introducing the first aqueous solution into the first chamber at the first pressure can allow the first aqueous solution to pass through a first fluid path having a first capillary valve with a first pressure threshold that is lower than the first pressure. Introducing the non-aqueous fluid into the first chamber at the second pressure can force the first aqueous solution through a second fluid path having a second capillary valve with a second pressure threshold lower than the second pressure, but higher than the first pressure, into a second chamber of the at least two chambers. When the non-aqueous fluid is introduced into the first chamber, it can flow into the first chamber until it reaches a bypass fluid path at which point a first portion of the first chamber can be filled with the non-aqueous fluid. The bypass fluid path can have a bypass capillary valve with an aqueous bypass pressure threshold higher than the second pressure and a non-aqueous bypass pressure threshold lower than the second pressure. Once the non-aqueous fluid has filled the first portion and reaches the bypass valve, the non-aqueous fluid can begin to flow through the bypass fluid path. Introducing the second aqueous solution into the first chamber at the third pressure can force the non-aqueous fluid out of the first chamber, through the bypass fluid path, until the second aqueous solution has replaced the non-aqueous fluid in the first portion of the first chamber.

The disclosure additionally provides a method of isolating a first aqueous solution and a second aqueous solution. The method comprises: a) introducing the first aqueous solution into an inlet of a microfluidic device at a first pressure, the first pressure greater than a first pressure threshold of a first capillary valve and less than a second pressure threshold of a second capillary valve; b) subsequent to step a), introducing a non-aqueous fluid into the inlet of the microfluidic device at a second pressure, the second pressure greater than the second pressure threshold and less than a third pressure threshold of a third capillary valve; c) subsequent to step b), introducing the second aqueous solution into the inlet of the microfluidic device at a third pressure, the third pressure greater than the first pressure threshold and less than the second pressure threshold; and d) subsequent to step c), introducing the non-aqueous fluid into the inlet of the microfluidic device at a fourth pressure, the fourth pressure greater than the first pressure threshold and less than the second pressure threshold.

The disclosure also provides a method of isolating a first aqueous solution and a second aqueous solution. The method comprises: a) introducing the first aqueous solution into the inlet of the microfluidic device described herein at a first pressure; b) subsequent to step a), introducing a non-aqueous fluid into the inlet of the microfluidic device at a second pressure, the second pressure greater than the first pressure; c) subsequent to step b), introducing the second aqueous solution into the inlet of the microfluidic device at a third pressure, the third pressure less than the second pressure; d) subsequent to step c), introducing the non-aqueous fluid into the inlet of the microfluidic device at a fourth pressure, the fourth pressure less than the second pressure.

The disclosure further provides a method of isolating a first mixture comprising a first aqueous solution and a second aqueous solution and a second mixture comprising a third aqueous solution and the second aqueous solution. The method comprises: a) introducing the first aqueous solution into the inlet of the microfluidic device described herein at a first pressure; b) subsequent to step a), introducing a non-aqueous fluid into the inlet of the microfluidic device at a second pressure, the second pressure greater than the first pressure; c) subsequent to step b), introducing the third aqueous solution into the inlet of the microfluidic device at a third pressure, the third pressure less than the second pressure; d) subsequent to step c), introducing the non-aqueous fluid into the inlet of the microfluidic device at a fourth pressure, the fourth pressure greater than the second pressure; e) subsequent to step d), introducing the second aqueous solution into the inlet of the microfluidic device at a fifth pressure, the fifth pressure greater than the second pressure.

The disclosure additionally provides a method of isolating a mixture comprising at least two different aqueous solutions. The method comprises: a) introducing a first of the at least two different aqueous solutions into at least one chamber at a first pressure; b) subsequent to step a), introducing a non-aqueous fluid into the at least one chamber at a second pressure higher than the first pressure; c) subsequent to step b), introducing a second of the at least two different aqueous solutions into the at least one chamber at a third pressure.

The disclosure also provides a method of isolating a mixture comprising at least two different aqueous solutions. The method comprises: a) introducing a first of the at least two different aqueous solutions into at least one chamber; b) subsequent to step a), introducing a non-aqueous fluid into the at least one chamber; c) subsequent to step b), introducing a second of the at least two different aqueous solutions into the at least one chamber.

The disclosure further provides a method of isolating a mixture. The method comprises selectively introducing at least two different aqueous solutions into at least one chamber based on a pressure level of the at least two different aqueous solutions.

Thus, the disclosure provides a method for simultaneous generation and storage of isolated droplets of aqueous mixtures on a micro-scale, thus allowing for a multitude of concentrations to be tested for crystallization of proteins, while minimizing waste.

Figure 12:
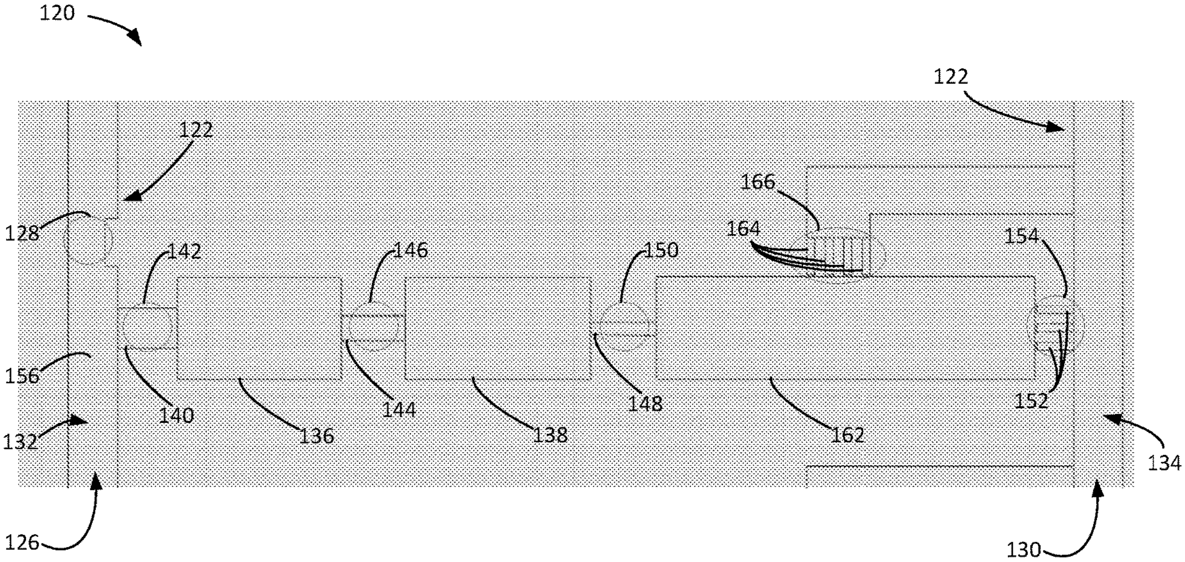
FIG. 12 is a schematic of a microfluidic device.

Referring now to FIG. 12, this disclosure provides another microfluidic device 120. The microfluidic device 120 is substantially similar to the microfluidic device 20, and as such, like features will be labeled similarly in the 100 series (e.g., inlet 26 and inlet 126, first chamber 36 and first chamber 136, etc.). The various differences between the two microfluidic devices 20, 120 will be discussed below. Combinations of features identified with respect to microfluidic device 20 and features identified with respect to microfluidic device 120 are expressly contemplated, so a feature discussed with respect to microfluidic device 20 is contemplated for use in microfluidic device 120 and vice versa.

In the microfluidic device 120, the third fluid path 148 instead provides fluid communication between the second chamber 138 and a third chamber 162. Further, the fourth fluid path 152 is alternatively disposed between and providing fluid communication between the third chamber 162 and the downstream portion 134. The microfluidic device 120 also includes a fifth fluid path 164 forming a fifth capillary valve 166. The fifth fluid path 164 also provides fluid communication between the third chamber 162 and the downstream portion 134, and is disposed upstream of the fourth fluid path 152. The fifth capillary valve 166 can similarly have a fifth aqueous pressure threshold and a fifth non-aqueous pressure threshold.

As with the microfluidic device 20, the aqueous pressure thresholds of the various capillary valves of the microfluidic device 120 can have various relations to one another in order to achieve certain effects. In one aspect, the first main channel pressure threshold can be greater than the first aqueous pressure threshold and lower than the second, third, fourth, and fifth aqueous pressure thresholds. The first aqueous pressure threshold can be lower than the second, third, fourth, and fifth aqueous pressure thresholds. The second aqueous pressure threshold can be greater than the first aqueous pressure threshold and lower than the third, fourth, and fifth aqueous pressure thresholds. The third pressure threshold can be greater than the first and second aqueous pressure thresholds and lower than the fourth and fifth aqueous pressure thresholds. The fourth and fifth aqueous pressure thresholds can be equal to each other.

Similarly, each of the capillary valves 128, 142, 146, 150, 154, 166 discussed above have corresponding non-aqueous pressure thresholds, which tend to be much lower than the corresponding aqueous pressure thresholds. These lower non-aqueous pressure thresholds are due to suitable non-aqueous fluids having significantly lower surface tensions than the surface tensions of typical aqueous solutions.

Each of the aqueous and non-aqueous pressure thresholds are proportional to the diameter of the corresponding capillary valve. Accordingly, in some instances, the first main channel capillary valve 128 may have a diameter between 87 μm and 93 μm. In other instances, the first main channel capillary valve 128 may have a diameter between 80 μm and 100 μm. In some instances, the first capillary valve 142 may have a diameter between 97 μm and 103 μm. In other instances, the first capillary valve 142 may have a diameter between 90 μm and 110 μm. In some instances, the second capillary valve 146 may have a diameter between 57 μm and 63 μm. In other instances, the second capillary valve 146 may have a diameter between 50 μm and 70 μm. In some instances, the third capillary valve 150 may have a diameter between 27 μm and 33 μm. In other instances, the third capillary valve 150 may have a diameter between 20 μm and 40 μm. In some instances, the fourth capillary valve 154 and/or the fifth capillary valve 166 may have diameters between 17 μm and 23 μm. In other instances, the fourth capillary valve 154 and/or the fifth capillary valve 166 may have diameters between 10 μm and 30 μm.

In some instances, as illustrated in FIG. 12, the fourth fluid path 152 and the fifth fluid path 164 may comprise several individual fluid paths. Because the pressure thresholds of the fourth and fifth capillary valves 154 and 166 depend on the corresponding diameter of each individual fluid path, having several fluid paths allows for a higher rate of fluid flow through the fourth and fifth fluid paths 152, 164, while maintaining the same pressure thresholds.

Figure 13:
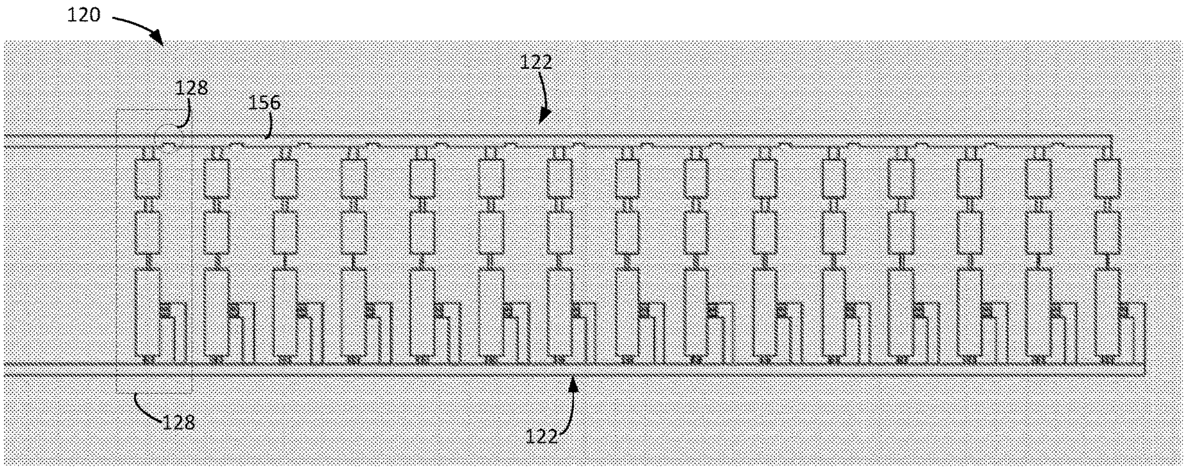
FIG. 13 is a schematic of the microfluidic device of FIG. 12, shown with multiple isolation units.

As with the microfluidic device 20, it should be appreciated that the microfluidic device 120 can similarly comprise any number of isolation units (e.g. first isolation unit 124, second isolation unit, third isolation unit, etc.), each in fluid communication with the main channel 122, as shown in FIG. 13. The isolation units can similarly be identical or non-identical to achieve certain effects.

Further, between the isolation units, the microfluidic device 120 can again have corresponding main channel capillary valves (e.g. the first main channel capillary valve 128, a second main channel capillary valve, a third main channel capillary valve, etc.), associated with the isolation units. Each of the main channel capillary valves may have corresponding main channel pressure thresholds (e.g. the first main channel pressure threshold, a second main channel pressure threshold, a third main channel pressure threshold, etc.) within the main channel 122 creating pressure-dependent barriers between each isolation unit, as shown in FIG. 13, to allow for the sequential filling of the isolation units, as discussed in detail above with respect to the microfluidic device 20.

Figure 14:
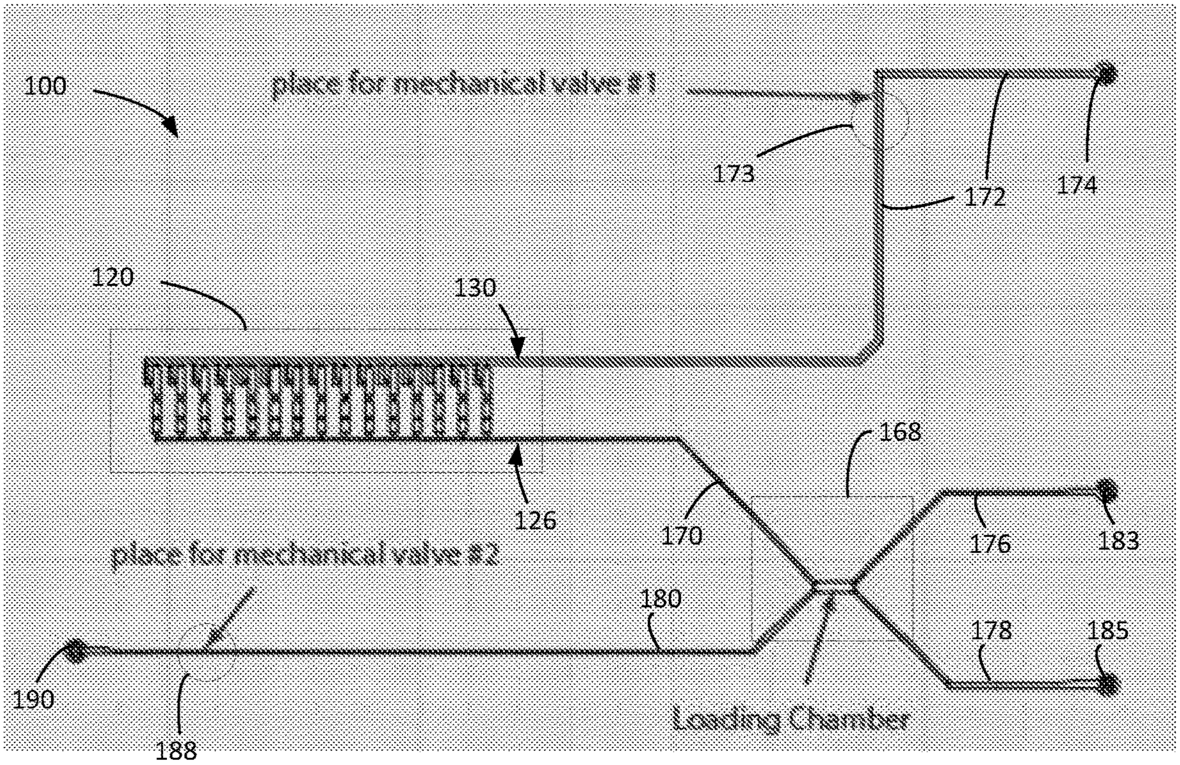
FIG. 14 is a schematic of a microfluidic system, including an injection system and the microfluidic device of FIG. 13.

Referring now to FIG. 14, this disclosure provides a microfluidic system 100. The microfluidic system 100 includes the microfluidic device 120 and a microfluidic injection system 168. The inlet 126 of the microfluidic device 120 is in fluid communication with a working fluid outlet path 170 of the microfluidic injection system 168, and the outlet 130 of the microfluidic device 120 is in fluid communication with a system outlet line 172. The system outlet line 172 may include a selectively-actuated downstream valve 173 and be in fluid communication with a system outlet 174. The selectively-actuated downstream valve 173 can be selectively opened or closed to selectively permit fluid flow therethrough. The selectively-actuated downstream valve 173 can, for example, be a mechanical valve, an electrically-actuated valve, or any other suitable valve for use with microfluidics.

Figure 15:
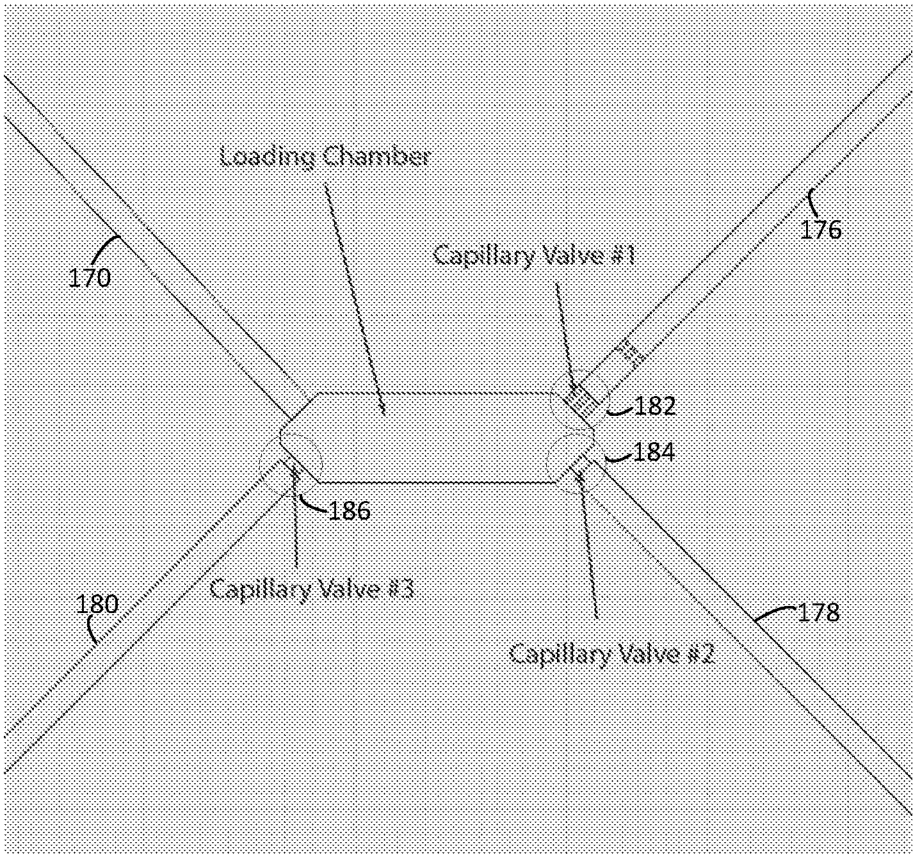
FIG. 15 is a schematic of the injection system of FIG. 14.

Referring now to FIG. 15, the injection system 168 is configured to allow for a predetermined amount of aqueous solution to be delivered to the microfluidic device 120. The injection system 168 comprises an aqueous inlet path 176, a non-aqueous inlet path 178, a bypass outlet path 180, the working fluid outlet path 170, and a loading chamber 181. In some instances, the aqueous inlet path 176 may include an aqueous inlet capillary valve 182 having an aqueous inlet pressure threshold. The aqueous inlet path 176 may further be in fluid communication with an aqueous solution source 183. The aqueous solution source 183 may be configured to provide an aqueous solution 192 (shown in FIG. 16) to the aqueous inlet path 176 at a desired pressure using a pressure-controlled pump. The non-aqueous inlet path 178 may include a non-aqueous inlet capillary valve 184 having a non-aqueous inlet pressure threshold. The non-aqueous inlet path 178 may further be in fluid communication with a non-aqueous fluid source 185. The non-aqueous fluid source 185 may be configured to provide a non-aqueous fluid 194 (shown in FIG. 16) to the non-aqueous fluid path 178 at a desired pressure using a pressure controlled pump. The bypass outlet path 180 may include a bypass outlet capillary valve 186 having a bypass pressure threshold. The bypass outlet 180 may additionally include a selectively-actuated bypass valve 188 and may be in communication with a system bypass outlet 190, as shown in FIG. 14.

In some instances, the aqueous inlet pressure threshold may be higher than the non-aqueous inlet pressure threshold and the bypass pressure threshold. The non-aqueous inlet pressure threshold may be lower than the aqueous inlet pressure threshold and higher than the bypass pressure threshold. The bypass pressure threshold can be lower than both the aqueous inlet pressure threshold and the non-aqueous inlet pressure threshold.

Figure 16:
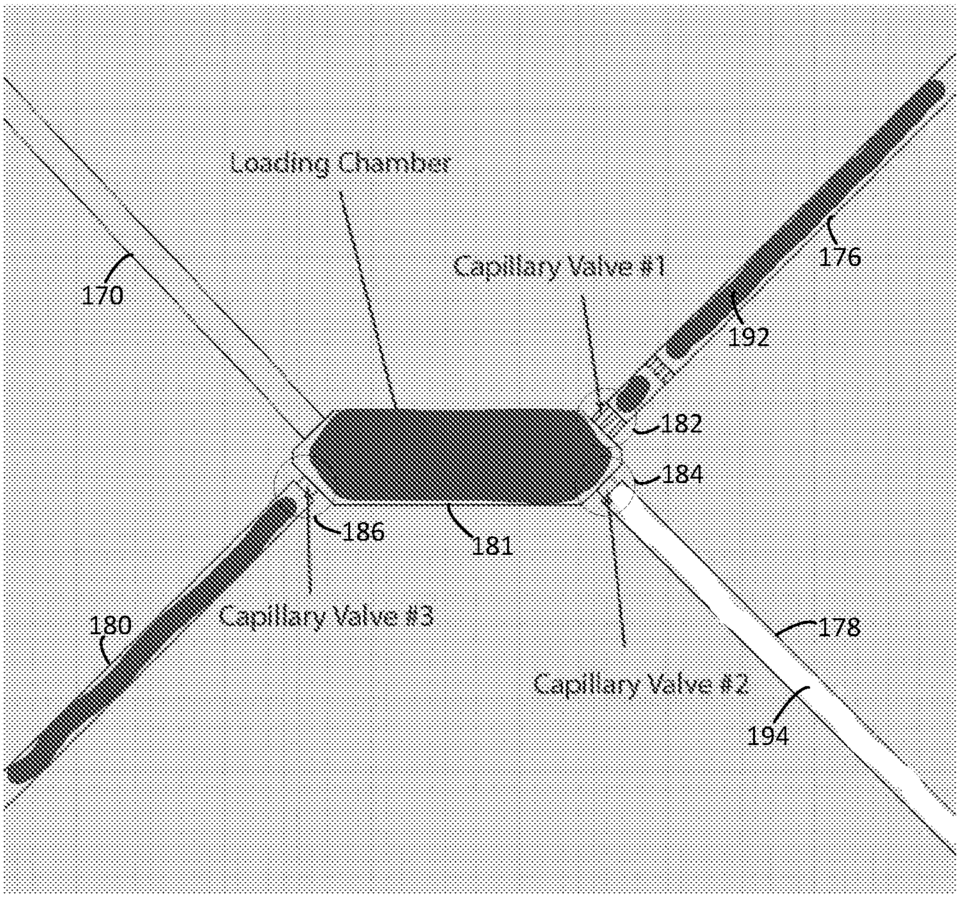
FIG. 16 is a schematic of the injection system of FIG. 14, shown in a loading configuration.
Figure 17:
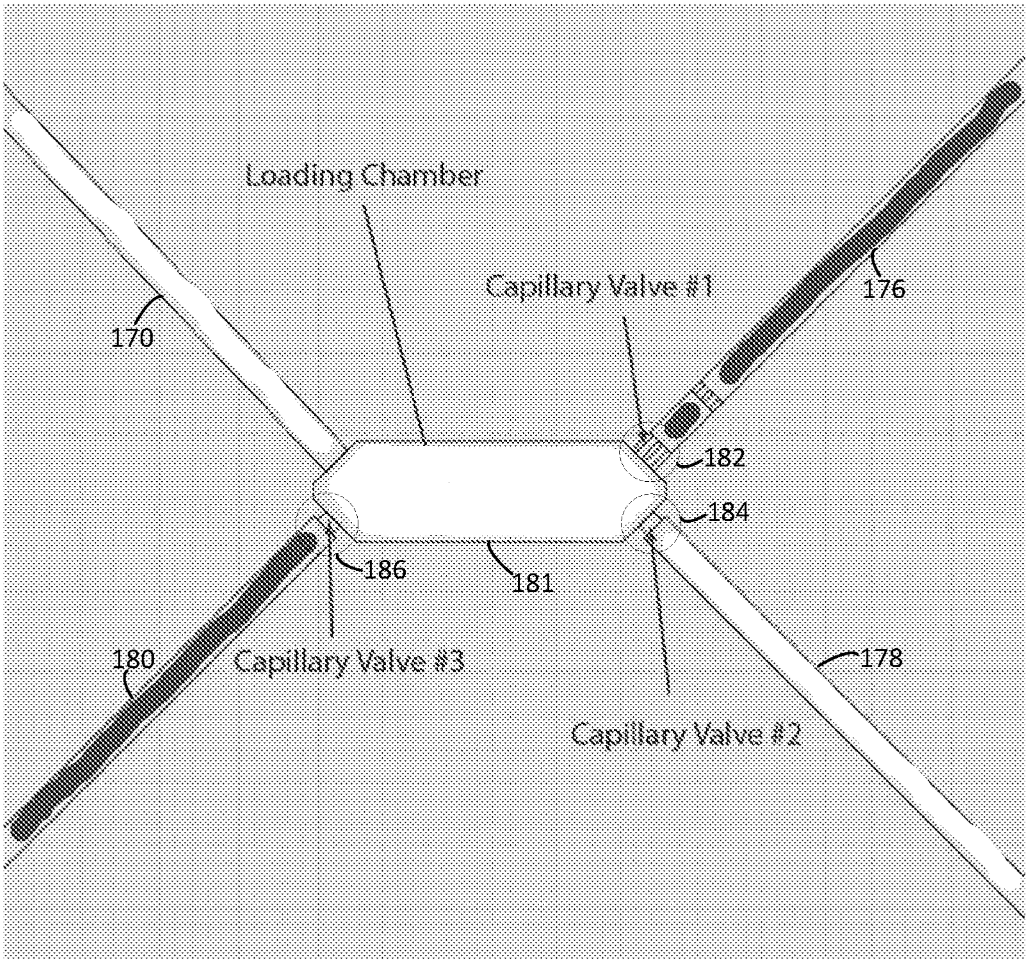
FIG. 17 is a schematic of the injection system of FIG. 14, shown in an injecting configuration.
Figure 18:
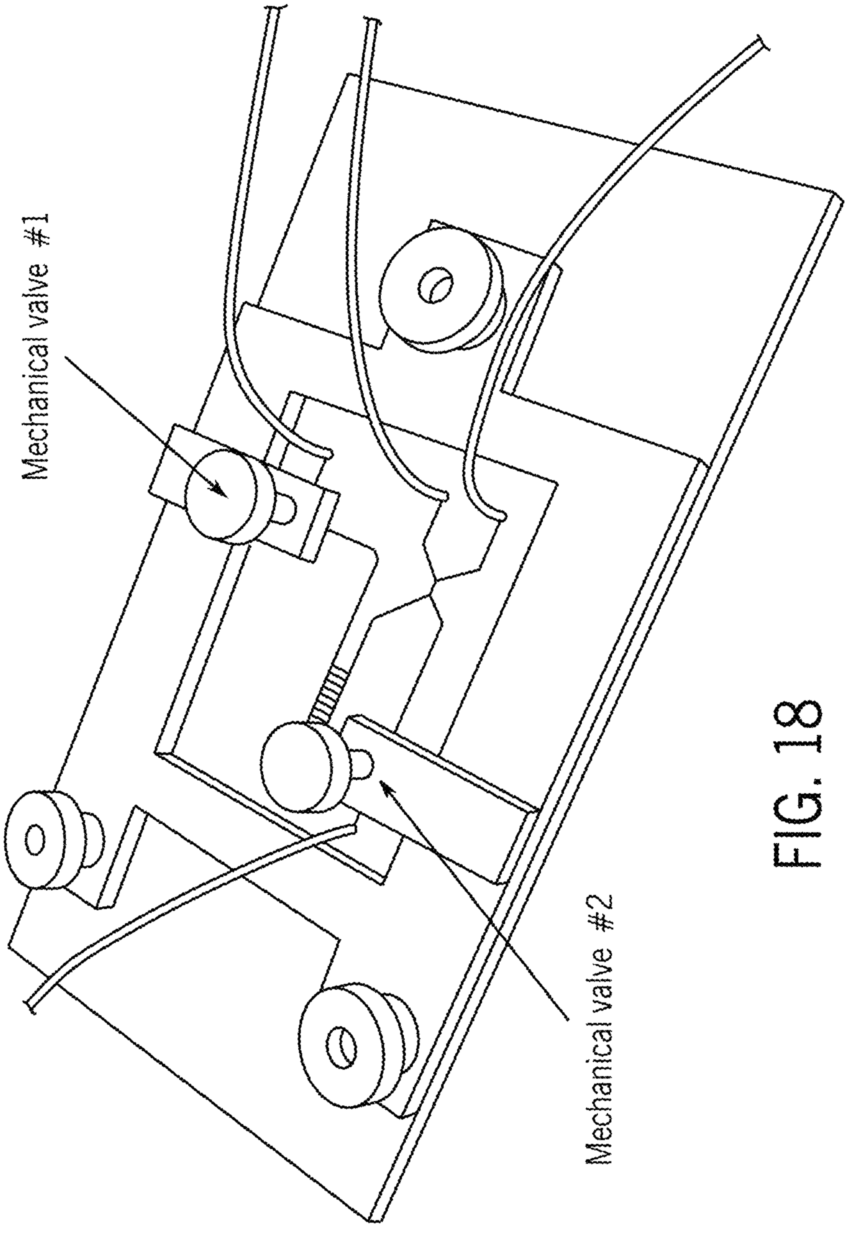
FIG. 18 is an image of a prototype of the microfluidic system of FIG. 14. Like reference numerals will be used to refer to like parts from FIG. 1 to FIG. 18 in the following description of the drawings.

As shown in FIGS. 16 and 17, the injection system 168 can be moved between a loading configuration (as shown in FIG. 16) and an injection configuration (as shown in FIG. 17).

Referring to FIG. 16, in the loading configuration, the selectively-actuated bypass valve 188 is moved into the opened configuration and the selectively-actuated downstream valve 173 is moved into the closed configuration. As such, the aqueous solution 192 can be supplied to the loading chamber 181 through the aqueous inlet path 176 from the aqueous solution source 183. As the aqueous solution 192 is supplied to the loading chamber 181, it flows through the aqueous inlet capillary valve 182. Because the selectively-actuated downstream valve 173 is closed, no aqueous solution 192 can flow into the working fluid outlet path 170. Further, because the selectively-actuated bypass valve 188 is opened, and the bypass outlet capillary valve 186 has a lower pressure threshold than the non-aqueous inlet capillary valve 184, the aqueous solution 192 flows through the aqueous inlet path 176, fills the loading chamber 181, and out of the bypass outlet path 180.

Referring to FIG. 17, in the injection configuration, the selectively-actuated bypass valve 188 is moved into the closed configuration and the selectively-actuated downstream valve 173 is moved into the opened configuration. As such, the non-aqueous fluid 194 can be supplied to the loading chamber 181 from the non-aqueous fluid source 185, which thereby pushes the aqueous solution 192 out of the loading chamber 181, through the working fluid outlet path 170, and into the microfluidic device 120. As the non-aqueous fluid 194 is supplied to the loading chamber 181, it flows through the non-aqueous inlet path 178. Because the selectively-actuated bypass valve 188 is closed, no aqueous solution or non-aqueous fluid can flow into the bypass outlet path 180. Further, because the selectively-actuated downstream valve 173 is opened, and the working fluid outlet path 170 does not include a capillary valve, the non-aqueous fluid 194 pushes the aqueous solution 192 that was disposed within the loading chamber 181 through the working fluid outlet path 170 and into the microfluidic device 120.

Accordingly, by first loading the loading chamber 181 with the aqueous solution 192 using the loading configuration, and subsequently injecting the aqueous solution 192 into the microfluidic device 120 using the injection configuration, the injection system 168 allows for a predetermined amount of aqueous solution 192 to be delivered to the microfluidic device 120. Further, by selectively opening and closing the selectively-actuated downstream valve 173 and the selectively-actuated bypass valve 188, the selectively-actuated valves 173, 188 are configured to collectively allow for predetermined amounts of various aqueous solutions to be delivered to the microfluidic device 120 sequentially.

In certain aspects, the loading chamber 181 can have a have a volume of between 10 pL and 10 mL, including but not limited to, a volume of between 1 nL and 1 mL, or between 10 nL and 100 nL.

In some instances, the microfluidic system 100 may include multiple injection systems similar to the injection system 168 configured to supply aqueous solutions and/or non-aqueous fluids at varying pressures or volumes. Thus, in some instances, the microfluidic system 100 may allow for selectively producing multi-volume isolated droplets using variable pressures.

In some cases, when the microfluidic system 100 includes more than one injection system similar to injection system 168, the various injection systems may be connected in series. In other instances, when the microfluidic system 100 includes more than one injection system similar to injection system 168, the various injection systems may be connected in parallel.

Control of the system can be manual, partially automated, or fully automated, as would be understood by those having ordinary skill in the art of control systems.

In one specific, non-limiting aspect, which is compatible with all embodiments described herein unless the context clearly dictates otherwise, the system 20 is operated at pressure that ensure that certain valves remain closed for aqueous liquids and are always open for oil. In these instances, the valves 50 and 54 can be surface treated to be oleophilic. This provides a very low (and in some cases no-existent) pressure threshold for these valves 50 and 54 when oil is the liquid contacting the valves 50 and 54 and a very high pressure threshold when water or an aqueous liquid is contacting the valves 50 and 54. The system 20 can be controlled to keep the pressure below this very high pressure threshold, thereby ensuring that water or aqueous liquid does not pass through valves 50 and 54. Similarly, each of the other valves in the system is typically treated to be oleophilic so it is open to oil and has some pressure threshold (usually determined by the size of the valve) for water or aqueous liquids.

In another specific, non-limiting aspect, which is compatible with all embodiments described herein unless the context clearly dictates otherwise, the system 20 is prepared for use by loading the entire system 20 with oil and degassing the oil contained within the system 20.

In typical use, inlet 26 is the point where liquids are introduced into the system 20 and the outlet 30 is the point where liquids exit the system 20.

While the systems described herein have been described for use in certain contexts (e.g., protein crystallization screening and in situ protein x-ray diffraction), a person having ordinary skill in the art will appreciate that the system is not limited to such uses and is applicable to any low-volume liquid handling applications that would benefit from the volume control and isolation abilities described herein. Non-limiting examples of suitable applications include, but are not limited to, biological studies, stem cell research, chemical biology, microbiological research, and other applications that require low sample volumes, are preferably conducted with passive control valves, and/or can favorably utilize the capabilities of having multiple mixing ratios in a single chip. The volume of the various chambers, the configuration of the injection loop, and the mixing ratios can be adjusted based on the desired application.

In one particular non-limiting example, the systems described herein can be used for high performance immunoassays. The fluidic device and injector platform can be used to perform rapid and low cost immunoassays with an enhanced range of detection. We propose here a range of methods to generate the reactive assay and to perform the analytical procedure.

The basic methods involves two steps: a) coating the blocking of the flow cell with a capture antibody; and b) performing the assay. It should be appreciated that the following description of this method is merely exemplary and various modifications to the method would be apparent to those having ordinary skill in the art.

The coating of step a) is performed by applying a solution of the capture antibody through port 26. A solution of Phosphate buffer or Carbonate buffer containing the capture antibody at a working concentration is introduced into chamber 36, as shown in FIG. 2. The solution in the dead spaces is then recovered and the channels rinced while the coating proceeds for a length of time ranging from a few minutes to overnight (FIG. 3). At the end of the coating period blocking buffer (such as PBS-Tween 20 0.1%-Bovine serum albumin is injected in the chip to rinse the coating buffer and allowed to coat the surfaces of all the channels and chambers. The blocking buffer is allowed to incubate for a duration of minutes to hours, possibly from the time of the coating until use months later.

The performing the assay of step b) is exemplified in this paragraph and subsequent paragraphs. The sample to be assayed is diluted in the appropriate diluent. The chamber 36 is filled with the solution as per FIG. 2 and the channels flushed with washing buffer (PBS Tween solution). The flow cell is incubated for the appropriate duration (FIG. 3). The flow cells and the channels are then washed with washing buffer (FIG. 1).

The same procedure is then performed with a solution of detection antibody labeled with HRP (horseradish peroxidase) (FIG. 2) and the channels washed with washing buffer (FIG. 3). The incubation is performed for the appropriate dilution and the chambers and channels washed with washing buffer.

The revelation of the assay is performed with TMB. A solution of TMB is flowed into the channels (FIG. 2). After an incubation of 1 minute, the TMB is then flowed with valve 54 closed to fill chamber 38. Valve 46 is then closed to separate chambers 36 and 38, and valve 42 to separate it from fresh TMB in channel 26. An optical device will measure in chamber 38 the absorbance of the TMB at 380 nm and 650 nm, providing a first determination in the range of very high substrate concentration.

A second determination for high concentrations is then performed: Valve 54 remains closed and valves 50 and 46 are opened. TMB is flowed in channel 26 to push the TMB that has incubated for 5 minutes in chamber 36 into channel 38. The contents of chamber 38 (previously read) is flushed away and replaced with the contents of chamber 36. All valves are then closed to incubate TMB with the HRP in chamber 36. Incubation is then conducted for an extended period of time (25 minutes).

The process is repeated with 5-fold increments in the incubation time until a reading falling within the detection range is obtained.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A microfluidic system comprising:

a droplet isolation device including at least one isolation unit and at least one capillary valve, the isolation unit having at least one chamber configured to receive at least two different aqueous solutions, the at least one capillary valve configured to allow for the at least two different aqueous solutions to be introduced into the at least one chamber without mixing prior to entering the at least one chamber based at least in part on pressure levels of the at least two different aqueous solutions; and an injection system including an aqueous inlet, a non-aqueous inlet, a bypass outlet including a selectively-actuated bypass valve, a working fluid outlet in fluid communication with both the droplet isolation device and a selectively-actuated downstream valve, and a loading chamber in fluid communication with each of the aqueous inlet, the non-aqueous inlet, the bypass outlet, and the working fluid outlet, the selectively-actuated bypass valve and the selectively-actuated downstream valve being configured to collectively allow for a predetermined amount of each of the at least two different aqueous solutions to be delivered to the droplet isolation device sequentially.

2. The microfluidic system of claim 1, wherein the predetermined amount of each of the at least two different aqueous solutions is dependent on a volume of the loading chamber.

3. The microfluidic system of claim 1, wherein the selectively-actuated bypass valve is a mechanical valve.

4. The microfluidic system of claim 1, wherein the selectively-actuated downstream valve is a mechanical valve.

5. The microfluidic system of claim 1, wherein the aqueous inlet includes a first loading capillary valve adjacent to the loading chamber and having a first loading pressure threshold, the non-aqueous inlet includes a second loading capillary valve adjacent to the loading chamber and having a second loading pressure threshold, and the bypass outlet includes a third loading capillary valve adjacent to the loading chamber and having a third loading pressure threshold, and the first loading pressure threshold is greater than the second loading pressure threshold, and the second loading pressure threshold is greater than the third loading pressure threshold.

6. The microfluidic system of claim 5, wherein, when the selectively-actuated downstream valve is closed and the selectively-actuated bypass valve is opened, the loading chamber is configured to receive one of the at least two different aqueous solutions from the aqueous inlet without the one of the at least two different aqueous solutions entering the droplet isolation device.

7. The microfluidic system of claim 6, wherein, when the loading chamber is filled with the one of the at least two different aqueous solutions and when the selectively-actuated downstream valve is opened and the selectively-actuated bypass valve is closed, the injection system is configured to inject the predetermined amount of the one of the at least two different aqueous solutions from the loading chamber into the droplet isolation device.

8. The microfluidic system of claim 1, wherein the loading chamber has a volume of between 10 pL and 10 mL.

9. A microfluidic injection system for injecting predetermined amounts of aqueous fluid into a microfluidic device, the microfluidic injection system comprising:

an aqueous inlet;

a non-aqueous inlet;

a bypass outlet including a selectively-actuated bypass valve;

a working fluid outlet in fluid communication with the microfluidic device and a selectively-actuated downstream valve; and a loading chamber in fluid communication with each of the aqueous inlet, the non-aqueous inlet, the bypass outlet, and the working fluid outlet, the selectively-actuated bypass valve and the selectively-actuated downstream valve being configured to collectively allow for a predetermined amount of an aqueous solution to be delivered to the microfluidic device; and wherein the aqueous inlet includes a first loading capillary valve adjacent to the loading chamber and having a first loading pressure threshold, the non-aqueous inlet includes a second loading capillary valve adjacent to the loading chamber and having a second loading pressure threshold, and the bypass outlet includes a third loading capillary valve adjacent to the loading chamber and having a third loading pressure threshold, and the first loading pressure threshold is greater than the second loading pressure threshold, and the second loading pressure threshold is greater than the third loading pressure threshold.

10. The microfluidic injection system of claim 9, wherein the predetermined amount of the aqueous solution is dependent on a volume of the loading chamber.

11. The microfluidic injection system of claim 9, wherein the selectively-actuated bypass valve is a mechanical valve.

12. The microfluidic injection system of claim 9, wherein the selectively-actuated downstream valve is a mechanical valve.

13. The microfluidic injection system of claim 9, wherein, when the selectively-actuated downstream valve is closed and the selectively-actuated bypass valve is opened, the loading chamber is configured to receive the aqueous solution from the aqueous inlet without the aqueous solution entering the working fluid outlet.

14. The microfluidic injection system of claim 9, wherein, when the loading chamber is filled with the aqueous solution and when the selectively-actuated downstream valve is opened and the selectively-actuated bypass valve is closed, the microfluidic injection system is configured to inject the predetermined amount of the aqueous solution from the loading chamber into the working fluid outlet.

15. The microfluidic injection system of claim 9, wherein the loading chamber has a volume of between 10 pL and 10 mL.

* * * * *